(12) United States Patent
Fukawatase et al.

(10) Patent No.: US 11,001,220 B2
(45) Date of Patent: May 11, 2021

(54) PASSENGER PROTECTION DEVICE FOR FRONT PASSENGER SEAT

(71) Applicant: TOYOTA JIDOSHA KABUSHIKI KAISHA, Toyota (JP)

(72) Inventors: Osamu Fukawatase, Miyoshi (JP); Hiroe Sugawara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 16/014,831

(22) Filed: Jun. 21, 2018

(65) Prior Publication Data

US 2019/0054888 A1 Feb. 21, 2019

(30) Foreign Application Priority Data

Aug. 21, 2017 (JP) .............................. JP2017-158941

(51) Int. Cl.
*B60R 21/231* (2011.01)
*B60R 21/214* (2011.01)
(Continued)

(52) U.S. Cl.
CPC .......... *B60R 21/232* (2013.01); *B60R 21/206* (2013.01); *B60R 21/214* (2013.01);
(Continued)

(58) Field of Classification Search
CPC ... B60R 21/232; B60R 21/231; B60R 21/214; B60R 21/206; B60R 21/213;
(Continued)

(56) References Cited

U.S. PATENT DOCUMENTS 3,970,328 A * 7/1976 Wallsten ............... B60R 21/231
280/731
7,758,069 B2 7/2010 Enders
(Continued)

FOREIGN PATENT DOCUMENTS

CN 102753399 A 10/2012
CN 106494345 A 3/2017
(Continued)

OTHER PUBLICATIONS

U.S. Appl. No. 16/029,236, filed Jul. 6, 2018 in the name of Yuichi Kitagawa.
(Continued)

*Primary Examiner* — Keith J Frisby
(74) *Attorney, Agent, or Firm* — Oliff PLC

(57) ABSTRACT

A passenger protection device for a front passenger seat includes: an upper airbag that is installed in a front header of a vehicle, and is configured to inflate and deploy at a time of a frontal collision of the vehicle so as to be supported by a windshield from a front side of the vehicle; and a lower airbag that is provided separately from the upper airbag and installed at a front end of a vehicle cabin below the windshield in a vehicle height direction, the lower airbag being configured to inflate and deploy at the time of the frontal collision so as to be supported by a dashboard including an instrument panel from the front side of the vehicle.

8 Claims, 11 Drawing Sheets

(51) Int. Cl.
    *B60R 21/206* (2011.01)
    *B60R 21/232* (2011.01)
    *B60R 21/00* (2006.01)

(52) U.S. Cl.
    CPC .... *B60R 21/231* (2013.01); *B60R 2021/0004* (2013.01); *B60R 2021/23107* (2013.01); *B60R 2021/23169* (2013.01); *B60R 2021/23176* (2013.01)

(58) Field of Classification Search
    CPC .. B60R 2021/23176; B60R 2021/0004; B60R 2021/23169; B60R 2021/23107; B60R 2021/23115
    USPC .......................................... 280/730.1, 743.1
    See application file for complete search history.

(56) References Cited

U.S. PATENT DOCUMENTS

| | | |
|---|---|---|
| 2002/0149181 A1 | 10/2002 | Eyrainer et al. |
| 2004/0256841 A1* | 12/2004 | Bakhsh ................ B60R 21/02 280/730.1 |
| 2005/0275198 A1 | 12/2005 | Peng et al. |
| 2006/0290111 A1 | 12/2006 | Kokeguchi |
| 2007/0267852 A1 | 11/2007 | Enders |
| 2008/0243342 A1 | 10/2008 | Breed |
| 2011/0049846 A1 | 3/2011 | Hirth et al. |
| 2011/0241318 A1 | 10/2011 | Miyajima |
| 2013/0127142 A1 | 5/2013 | Fukawatase |
| 2015/0061268 A1 | 3/2015 | Nagasawa |

FOREIGN PATENT DOCUMENTS

| | | |
|---|---|---|
| EP | 1937517 B1 | 8/2011 |
| GB | 1328903 A | 9/1973 |
| JP | S49-092729 A | 9/1974 |
| JP | H07-117605 A | 5/1995 |
| JP | 2004-244006 A | 9/2004 |
| JP | 2005-335694 A | 12/2005 |
| JP | 2006-076418 A | 3/2006 |
| JP | 2007-008219 A | 1/2007 |
| JP | 2007-022416 A | 2/2007 |
| JP | 2007-106376 A | 4/2007 |
| JP | 2008-149965 A | 7/2008 |
| JP | 2011-502069 A | 1/2011 |
| JP | 2011-502070 A | 1/2011 |
| JP | 2015-044548 A | 3/2015 |
| KR | 10-2016-0028861 A | 3/2016 |

OTHER PUBLICATIONS

Sep. 8, 2020 Office Action issued in U.S. Appl. No. 16/851,463.
Partial Translation of Aug. 18, 2020 Notification of Reason(s) for Refusal issued in Japanese Patent Application No. 2017-158941.
Jan. 14, 2021 Notice of Allowance issued in U.S. Appl. No. 16/851,463.

* cited by examiner

PASSENGER PROTECTION DEVICE FOR FRONT PASSENGER SEAT

INCORPORATION BY REFERENCE

The disclosure of Japanese Patent Application No. 2017-158941 filed on Aug. 21, 2017 including the specification, drawings and abstract is incorporated herein by reference in its entirety.

BACKGROUND

1. Technical Field

The present disclosure relates to a passenger protection device for a front passenger seat.

2. Description of Related Art

The passenger protection device for a vehicle front passenger seat described in Japanese Patent Application Publication No. 2007-022416 (JP 2007-022416 A) has a bag member (front passenger seat airbag) housed in an upper part of an instrument panel and a knee airbag member (knee airbag) housed in a rear lower part of the instrument panel. During a collision of the vehicle, the front passenger seat airbag inflates and deploys upward and rearward from an upper surface of the instrument panel, and thereby restrains the upper body of the passenger while receiving reaction forces from the windshield and the instrument panel. During a collision of the vehicle, the knee airbag inflates and deploys rearward from a rear surface of the instrument panel, and thereby restrains the lower body of the passenger while receiving a reaction force from the instrument panel.

The automotive overhead airbag described in Japanese Patent Application Publication No. 2005-335694 (JP 2005-335694 A) is housed in a front end of a roof (front header) of a vehicle. During a collision of the vehicle, this airbag inflates and deploys downward and rearward from the front header so as to be interposed between the upper body of the passenger and the instrument panel, and thereby restrains the upper body of the passenger while receiving a reaction force from the instrument panel.

SUMMARY

Both the related arts described in JP 2007-022416 A and JP 2005-335694 A use the instrument panel as the reaction surface (support surface) for the airbags. For future self-driving vehicles, however, it is desired to enhance the feel of spaciousness of the cabin, and therefore downsizing the instrument panel (reducing the dimensions thereof in the vehicle height direction and the vehicle length direction) is being considered. Such a downsized instrument panel is difficult to secure therein a sufficient reaction surface for an airbag. On the other hand, setting the inclination of the windshield to a larger angle is also being considered for self-driving vehicles. A windshield having a large inclination angle is difficult to secure therein a sufficient reaction surface for an airbag that inflates and deploys from the instrument panel. Thus, without a sufficient reaction surface for an airbag being secured, it is difficult to secure the passenger restraining performance of the airbag.

The present disclosure provides a passenger protection device for a front passenger seat that allows the passenger restraining performance of an airbag to be easily secured even when the inclination of the windshield is increased and the instrument panel is downsized.

An aspect of the disclosure provides a passenger protection device for a front passenger seat. The passenger protection device according to the aspect includes: an upper airbag that is installed in a front header of a vehicle, and is configured to inflate and deploy at a time of a frontal collision of the vehicle so as to be supported by a windshield from a front side of the vehicle; and a lower airbag that is provided separately from the upper airbag and installed at a front end of a vehicle cabin below the windshield in a vehicle height direction, the lower airbag being configured to inflate and deploy at the time of the frontal collision so as to be supported by a dashboard including an instrument panel from the front side of the vehicle.

In the above aspect, the upper airbag may be configured to inflate and deploy toward a front side of a head of a front passenger at the time of the frontal collision; and the lower airbag may be configured to inflate and deploy toward a front side of left and right lower legs of the front passenger at the time of the frontal collision.

The "dashboard" in the above aspect is a member that constitutes a front wall of the vehicle cabin below the windshield in the vehicle height direction, and may include an instrument panel and a dashboard panel.

According to the above configuration, during a frontal collision of the vehicle, the upper airbag installed in the front header inflates and deploys toward the front side of the head of the front passenger, while the lower airbag installed at the front end of the vehicle cabin below the windshield in the vehicle height direction inflates and deploys toward the front side of the left and right lower legs of the front passenger.

Here, the lower airbag inflates and deploys toward the front side of the left and right lower legs that are located relatively close to the dashboard among the body parts of the front passenger, and is supported by the dashboard from the front side of the vehicle. The left and right lower legs of the front passenger can be restrained quickly and effectively by this lower airbag.

The upper airbag inflates and deploys from the front header disposed close to the head of the front passenger, and is supported by the windshield from the front side of the vehicle. Since the windshield is joined at an upper end thereof to the front header, a large area of the windshield in the height direction can be used as the support surface (reaction surface) for the upper airbag that inflates and deploys from the front header. Thus, even when the inclination of the windshield is increased and the instrument panel is downsized, a reaction surface for the upper airbag can be easily secured, and the head of the front passenger can be restrained quickly and effectively by the upper airbag.

As has been described, the above aspect makes it possible to quickly restrain the left and right lower legs of the front passenger by the lower airbag so as to absorb the inertial energy of the front passenger, and at the same time to restrain the head of the front passenger with an adequate reaction force by the upper airbag that inflates and deploys from the front header and is supported by the windshield. Thus, even when the inclination of the windshield is increased and the instrument panel is downsized, the passenger restraining performance of the airbags (the upper airbag and the lower airbag) can be easily secured.

In the above aspect, the passenger protection device may include a frontal collision airbag that is installed in the front passenger seat of the vehicle or in a front passenger seatbelt, and is configured to inflate and deploy between the front passenger seat and at least one of the upper airbag and the lower airbag during the frontal collision.

In the above aspect, the frontal collision airbag may be configured to inflate and deploy between an upper body of a front passenger and at least one of the upper airbag and the lower airbag during the frontal collision.

According to this configuration, during a frontal collision of the vehicle, the upper airbag installed in the front header inflates and deploys toward the front side of the head of the front passenger, while the lower airbag installed at the front end of the vehicle cabin below the windshield in the vehicle height direction inflates and deploys toward the front side of the left and right lower legs of the front passenger. Moreover, in this case, the frontal collision airbag installed in the front passenger seat or the front passenger seatbelt inflates and deploys between the upper body of the front passenger and at least one of the upper airbag and the lower airbag. Thus, with at least one of the upper airbag and the lower airbag functioning as a reaction surface for the frontal collision airbag, the front passenger is restrained by the frontal collision airbag and the at least one of the upper airbag and the lower airbag. Thus configured, this passenger protection device can secure the performance of restraining the front passenger, even when the front passenger is seated at a distance from the inflated and deployed upper airbag and lower airbag toward a rear side of the vehicle.

In the above aspect, the upper airbag and the lower airbag may be each configured to inflate and deploy so as to form a frame structure upon receiving gas supply respectively from an inflator, the upper airbag may have a first frame-shaped inflation part that forms a framework of the upper airbag, and a plurality of first base fabrics, the plurality of first base fabrics being attached to the first frame-shaped inflation part and forming first walls of the upper airbag, and the lower airbag may have a second frame-shaped inflation part that forms a framework of the lower airbag, and a plurality of second base fabrics, the plurality of second base fabrics being attached to the second frame-shaped inflation part and forming second walls of the lower airbag.

According to this aspect, the frame-shaped inflation part of each of the upper airbag and the lower airbag that forms the framework of the airbag inflates and deploys so as to form a frame structure upon receiving gas supply from the inflator. The base fabrics attached to this frame-shaped inflation part form the walls of the airbag. This disclosure requires the gas from the inflator to be supplied to only the frame-shaped inflation part that forms the frame structure, which makes it possible to use low-power inflators while securing the volumes of the upper airbag and the lower airbag in the inflated and deployed state. As a result, for example, reductions in the cost of the inflators and in the installation space of the inflators can be achieved.

In the above aspect, the plurality of first base fabrics may include a first rear base fabric, a first bottom base fabric, a first left base fabric, and a first right base fabric that form a rear wall, a bottom wall, a left wall, and a right wall of the upper airbag, respectively; the first frame-shaped inflation part may be formed so as to surround the first rear base fabric and the first bottom base fabric; and the first left base fabric and the first right base fabric each may have a triangular shape of which two sides of three sides are shorter than the other one side, and edges constituting the two sides of the first left base fabric and edges constituting the two sides of the first right base fabric may be joined respectively to left and right side portions of the first frame-shaped inflation part such that the inflated and deployed first frame-shaped inflation part is bent so as to protrude toward a rear lower side of the vehicle as seen from a vehicle width direction, and the plurality of second base fabrics may include a second rear base fabric, a second bottom base fabric, a second left base fabric, and a second right base fabric that form a rear wall, a bottom wall, a left wall, and a right wall of the lower airbag, respectively; the second frame-shaped inflation part may be formed so as to surround the second rear base fabric and the second bottom base fabric; and the second left base fabric and the second right base fabric each may have a triangular shape of which two sides of three sides are shorter than the other one side, and edges constituting the two sides of the second left base fabric and edges constituting the two sides of the second right base fabric may be joined respectively to left and right side portions of the second frame-shaped inflation part such that the inflated and deployed second frame-shaped inflation part is bent so as to protrude toward a rear lower side of the vehicle as seen from a vehicle width direction.

In this configuration, the upper airbag formed by the frame-shaped inflation part and the base fabrics as described above has a substantially triangular shape of which the height dimension in the vehicle height direction decreases toward the front side of the vehicle, when seen from the vehicle width direction in the inflated and deployed state of the frame-shaped inflation part. This allows the upper airbag to be easily supported on a larger area of the windshield.

Similarly, the lower airbag formed by the frame-shaping inflation part and the base fabrics as described above has a substantially triangular shape of which the height dimension in the vehicle height direction decreases toward the front side of the vehicle, when seen from the vehicle width direction in the inflated and deployed state of the frame-shaped inflation part. This allows the lower airbag to be easily supported on a larger area of the surface of the downsized instrument panel that faces the left and right lower legs of the front passenger, even when the rearward inclination of this surface is set to a large angle.

In the above aspect, the upper airbag and the lower airbag may be configured such that the upper airbag and the lower airbag in an inflated and deployed state come in contact with each other in the vehicle height direction without the front passenger being restrained.

According to this configuration, the inflated and deployed upper airbag and lower airbag come in contact with each other in the height direction without the front passenger being restrained (with the front passenger being not yet restrained). Here, during a frontal collision of the vehicle, the upper body of the front passenger wearing the front passenger seatbelt assumes a forward inclined posture, so that the head of the front passenger comes in contact with the upper airbag in a direction toward an obliquely front lower side of the vehicle. Since the upper airbag and the lower airbag are in contact with each other in the height direction, the head is restrained also by the lower airbag through the upper airbag. As a result, the head restraining performance can be further enhanced.

In the above aspect, an internal pressure of the lower airbag in the inflated and deployed state may be set to be higher than an internal pressure of the upper airbag in the inflated and deployed state.

In this configuration, the internal pressures of the upper airbag and the lower airbag in the inflated and deployed state are set as described above. Thus, the left and right lower legs of the front passenger can be restrained effectively (i.e., with a large reaction force) by the lower airbag. When the head of the front passenger comes in contact with the upper airbag in a direction toward an obliquely front lower side, the head is gently restrained by the upper airbag and at the same time restrained by the lower airbag through the upper airbag. With the upper airbag thus supported by the lower airbag having a higher internal pressure, it is possible to restrict the upper airbag from shifting toward the lower side of the vehicle while reducing the reaction force directly input into the head. As a result, the head can be effectively restrained.

In the above aspect, a dimension in a vehicle width direction of the lower airbag in the inflated and deployed state may be larger than a dimension in the vehicle width direction of the upper airbag in the inflated and deployed state.

In this configuration, the dimensions in the vehicle width direction of the upper airbag and the lower airbag in the inflated and deployed state are set as described above. Thus, the upper airbag coming in contact with the lower airbag is stably supported by the lower airbag. Therefore, for example, even when the form of the frontal collision of the vehicle is an asymmetrical collision, such as an oblique collision or a small-overlap collision, and the head of the front passenger comes in contact with the upper airbag by moving toward an obliquely front lower side, the upper airbag can be restricted by the lower airbag from inclining in the direction of movement of the head. As a result, the head restraining performance during an asymmetrical collision can be enhanced.

In the above aspect, a side surface of the lower airbag in the inflated and deployed state on an outer side in a vehicle width direction may come in contact with a door trim of a side door of the vehicle.

In this configuration, the side surface of the inflated and deployed lower airbag on the outer side in the vehicle width direction comes in contact with the door trim of the side door. Thus, for example, even when the form of the frontal collision of the vehicle is an asymmetrical collision, such as an oblique collision or a small-overlap collision, and the left and right lower legs of the front passenger come in contact with the lower airbag by moving obliquely toward the front side of the vehicle and the outer side in the vehicle width direction, the lower airbag can be prevented from being displaced toward the outer side in the vehicle width direction. As a result, the performance of restraining the left and right lower legs during an asymmetrical collision can be enhanced.

As has been described above, the passenger protection device for a front passenger seat according to the aspects of the present disclosure allows the passenger restraining performance of airbags to be easily secured even when the inclination of the windshield is increased and the instrument panel is downsized.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
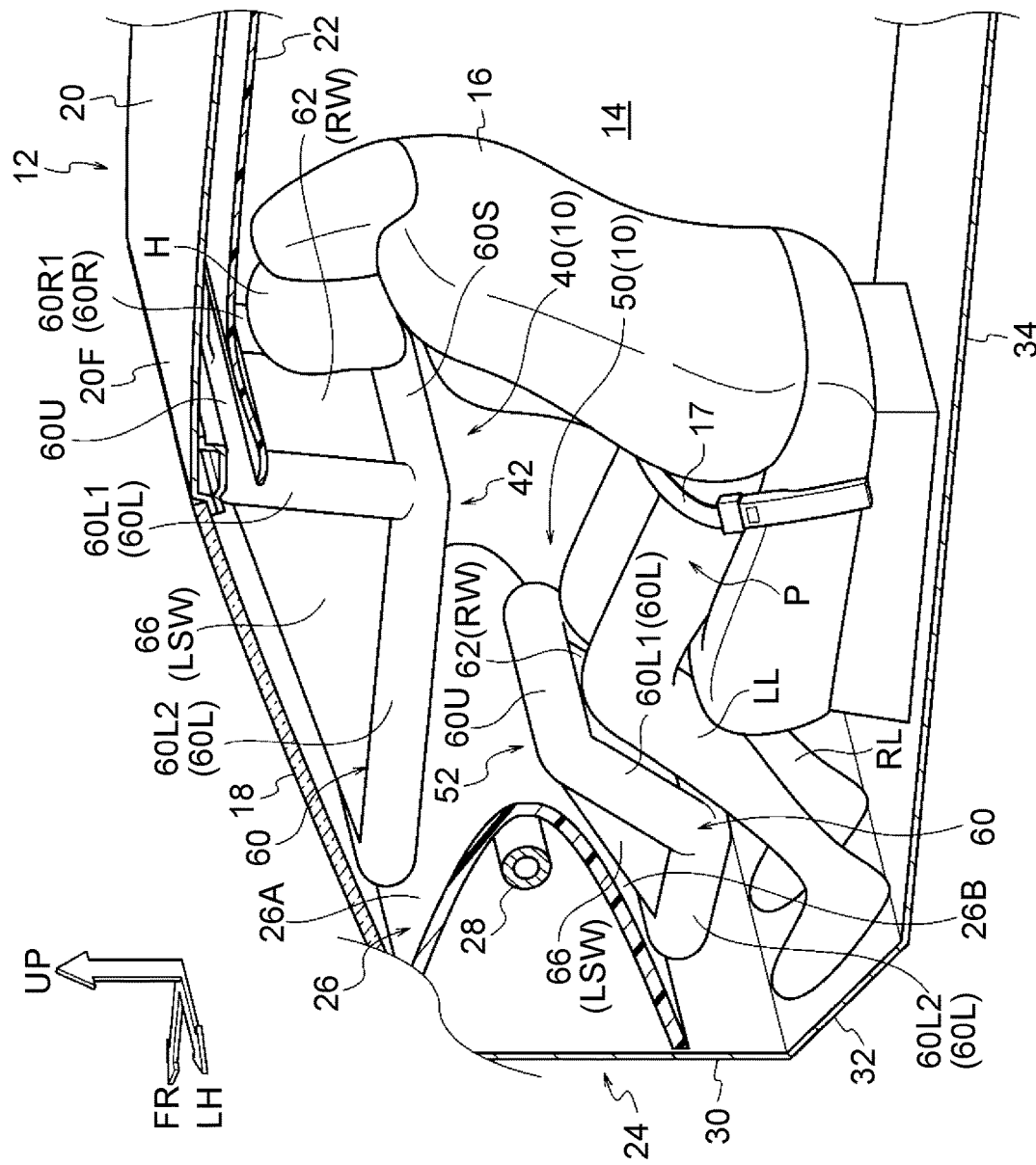
FIG. 1 is a partial sectional view of a front part of a cabin of a vehicle to which a passenger protection device for a front passenger seat according to a first embodiment of the present disclosure is applied, as seen from an obliquely rear left side of the vehicle, showing an inflated and deployed state of an upper airbag and a lower airbag.

A passenger protection device 10 for a front passenger seat according to a first embodiment of the present disclosure will be described below using FIG. 1 to FIG. 3. The arrows FR, UP, LH shown as necessary in the drawings respectively indicate a frontward direction (forward direction), an upward direction, and a leftward direction of a vehicle. Unless otherwise specified, those sides in the following description that are referred to simply as front and rear sides, left and right sides, and upper and lower sides respectively mean front and rear sides in a vehicle length direction, left and right sides in a vehicle lateral direction (vehicle width direction), and upper and lower sides in a vehicle height direction.

Configuration

The passenger protection device 10 for a front passenger seat according to this embodiment is a device that protects a passenger P seated in a front passenger seat 16 of a vehicle 12. As shown in FIG. 1 and FIG. 2, the passenger protection device 10 for a front passenger seat includes: a front passenger seat airbag device 40 including an upper airbag 42; a front passenger seat knee airbag device 50 including a lower airbag 52; and a control device (not shown) that controls actuation of the airbag devices 40, 50. The passenger P corresponds to the "front passenger" in the present disclosure. For example, the vehicle 12 is a sedan, and the front passenger seat 16 is disposed, for example, on the right side in a front part of a vehicle cabin 14. The front passenger seat 16 includes a backrest 16A and a seat section 16B. The front passenger seat 16 is provided with a three-point front passenger seatbelt 17 that restrains the passenger P. In the following, the schematic configuration of the vehicle cabin 14 will be described first, and then the configurations of the front passenger seat airbag device 40, the front passenger seat knee airbag device 50, and the control device will be sequentially described.

Configuration of Vehicle Cabin

Figure 2:
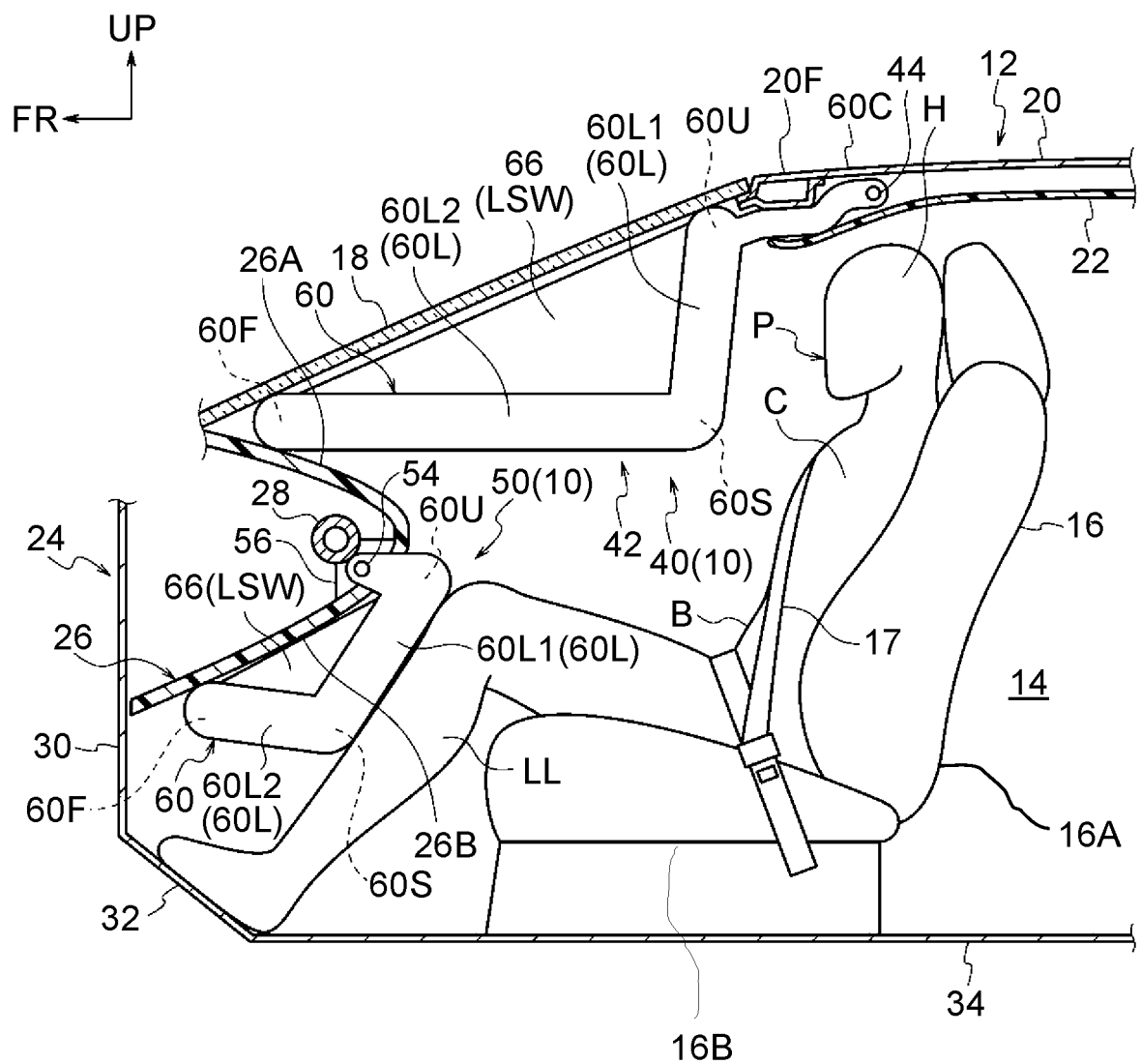
FIG. 2 is a partial sectional view of the configuration shown in FIG. 1, as seen from a left side of the vehicle.

As shown in FIG. 1 and FIG. 2, a windshield (front windshield glass) 18 is installed at a front end of the vehicle cabin 14. The windshield 18 extends from a front end of a roof (ceiling) 20 of the vehicle cabin 14 toward an obliquely front lower side of the vehicle. The inclination (the angle of rearward inclination) of the windshield 18 is set to a larger angle than the inclination of the windshield in a conventional typical sedan vehicle. A front end of the windshield 18 is supported on a cowl (not shown), and left and right ends of the windshield 18 are supported respectively on left and right front pillars (not shown). A rear end of the windshield 18 is supported on a front header 20F provided at the front end of the roof 20. The front header 20F extends in the vehicle width direction and has a closed cross-section. The roof 20 is covered by a roof head lining 22 from below in the vehicle height direction (from an inner side of the vehicle cabin).

A dashboard (dashboard part; partition wall) 24 is provided at the front end of the vehicle cabin 14. The dashboard 24 constitutes a front wall of the vehicle cabin 14 below the windshield 18 in the vehicle height direction, and includes an instrument panel 26, a dashboard panel 30, and a dashboard silencer (not shown).

The instrument panel 26 is made of resin, for example, and has a substantially U-shaped cross-section (substantially V-shaped cross-section) opening toward the front side of the vehicle as seen from the vehicle width direction. The instrument panel 26 is downsized (thinned) with the dimensions in the vehicle height direction and the vehicle length direction reduced from those of a conventional typical instrument panel. An upper surface 26A of the instrument panel 26 is inclined (curved) so as to slope downward toward the rear side of the vehicle, while a lower surface 26B of the instrument panel 26 is inclined (curved) so as to slope downward toward the front side of the vehicle. The lower surface 26B faces left and right lower legs LL, RL of the passenger P from the front upper side of the vehicle.

Inside the instrument panel 26, an instrument panel reinforcement 28 that supports a steering column (not shown) is installed. The instrument panel reinforcement 28 includes a metal pipe, for example, and is installed at the front end of the vehicle cabin 14 with a long-side direction thereof oriented in the vehicle width direction. Both ends of the instrument panel reinforcement 28 in the long-side direction are connected respectively to the left and right front pillars (not shown).

The dashboard panel 30 is made of a steel sheet, for example, and is disposed in front of the instrument panel 26 in the vehicle length direction, with a plate thickness direction thereof oriented in the vehicle length direction. A lower end of the dashboard panel 30 is joined to a front end of a floor panel 34 through a toe board 32. A dashboard silencer (not shown) made of rubber or fiber, for example, is attached to a surface of the dashboard panel 30 on the rear side in the vehicle length direction (the inner side of the vehicle cabin), and this dashboard silencer is covered with a carpet (not shown) from the rear side in the vehicle length direction (the inner side of the vehicle cabin).

Configuration of Front Passenger Seat Airbag Device

The front passenger seat airbag device 40 includes the upper airbag 42 that is installed in the front header 20F. The upper airbag 42 is configured to inflate and deploy during a frontal collision of the vehicle 12, toward the front side of a head H and a chest C of the passenger P so as to be supported by the windshield 18 from the front side of the vehicle. In FIG. 2, the abdomen of the passenger P is denoted by reference sign B. The front passenger seat airbag device 40 includes an inflator (upper inflator) 44 that supplies a gas for inflating and deploying the upper airbag 42 to the upper airbag 42, and an airbag case (not shown). The airbag case has a box shape opening toward the front side of the vehicle, for example, and is disposed near the rear side of the front header 20F in the vehicle length direction and fixed to the front header 20F by means such as bolt fastening. Inside the airbag case, the upper airbag 42 in a folded state and the inflator 44 are housed.

Figure 3:
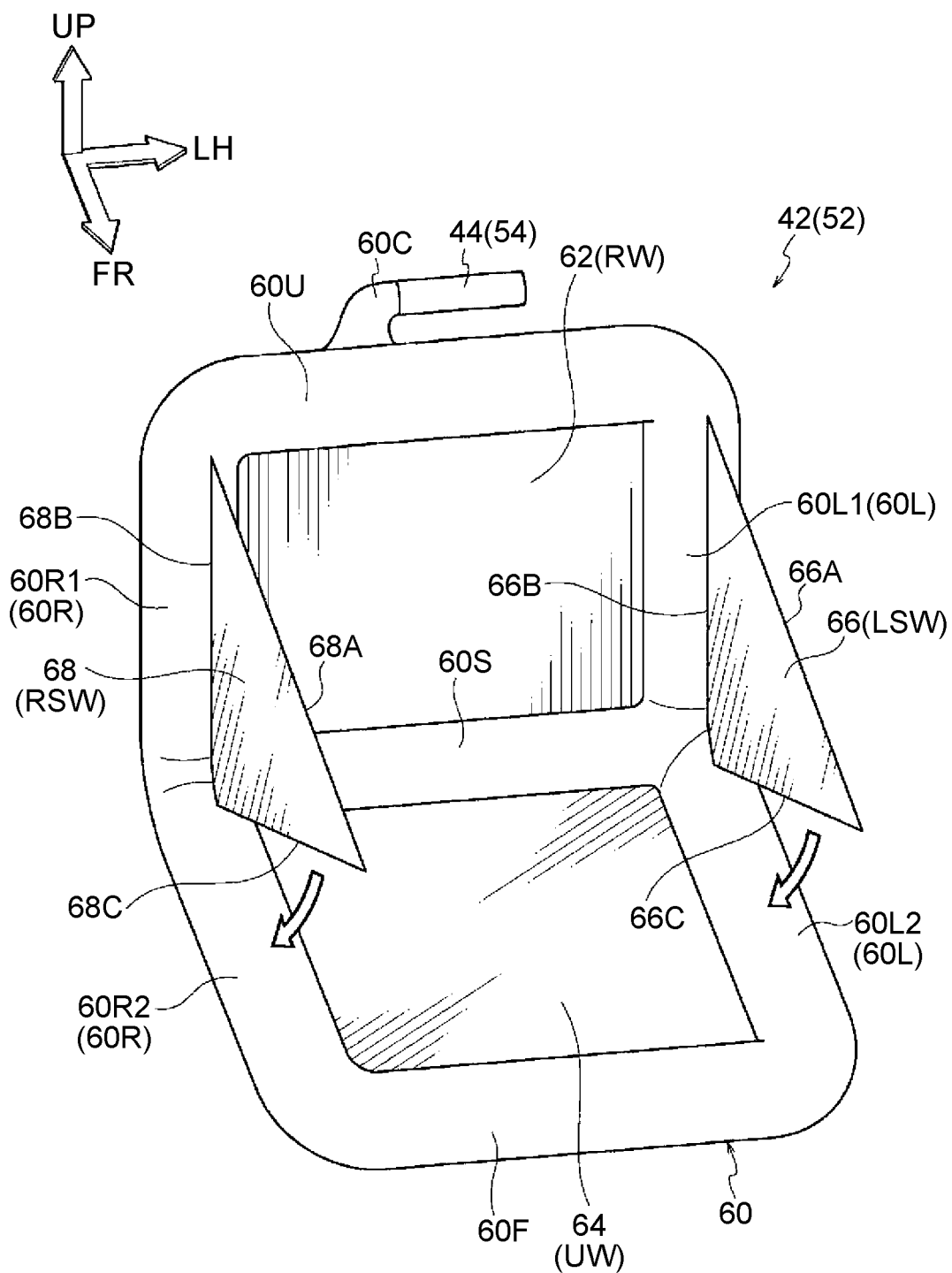
FIG. 3 is a perspective view showing the upper airbag (lower airbag) according to the first embodiment in a state of being manufactured.

As shown in FIG. 3, the inflator 44 is of a cylinder type, and is disposed in a position with an axial direction thereof oriented along the vehicle width direction. The inflator 44 is fixed to the front header 20F through a bracket (not shown). A gas blow-out portion (not shown) is provided at one end of the inflator 44 in the axial direction. When the inflator 44 is actuated, the gas is blown out from this gas blow-out portion.

As shown in FIG. 1 to FIG. 3, the upper airbag 42 includes a frame-shaped duct 60 as a frame-shaped inflation part. The frame-shaped duct 60 inflates and deploys so as to form a frame structure upon receiving gas supply from the inflator 44, and thus forms a framework of the upper airbag 42. A plurality of base fabrics that forms walls of the upper airbag 42 is attached to the frame-shaped duct 60.

Specifically, these base fabrics are: a rear base fabric 62 forming a rear wall RW of the upper airbag 42; a bottom base fabric 64 forming a bottom wall UW of the upper airbag 42; a left base fabric 66 forming a left wall LSW of the upper airbag 42; and a right base fabric 68 forming a right wall RSW of the upper airbag 42. For example, the rear base fabric 62, the bottom base fabric 64, the left base fabric 66, and the right base fabric 68 are formed by cutting out a nylon- or polyester-based fabric material. The rear base fabric 62 and the bottom base fabric 64 each have a rectangular shape, and the left base fabric 66 and the right base fabric 68 each have a triangular shape. Alternatively, the rear base fabric 62 and the bottom base fabric 64 may each have a substantially rectangular shape (e.g., elongated circular shape), and the left base fabric 66 and the right base fabric 68 may each have a substantially triangular shape (e.g., trapezoidal shape).

The frame-shaped duct 60 is formed, for example, by placing two base fabrics, each cut out in a substantially B-shape (a substantially closed E shape), one on top of the other and sewing together peripheral edges thereof so as to form a substantially B-shaped (substantially closed E-shaped) bag. Specifically, the frame-shaped duct 60 includes: left and right side duct portions 60L, 60R that have an elongated duct shape (tube shape; the same applies hereinafter) and extend parallel to each other; an upper duct portion 60U that has an elongated duct shape and links together ends of the left and right side duct portions 60L, 60R on one side in a long-side direction thereof (upper ends); a front duct portion 60F that has an elongated duct shape and links together ends of the left and right side duct portions 60L, 60R on the other side in the long-side direction (front ends); and a center duct portion 60S that has an elongated duct shape and links together intermediate points of the left and right side duct portions 60L, 60R in the long-side direction. The left and right side duct portions 60L, 60R correspond to the "left and right side portions of the frame-shaped duct" in the present disclosure.

The length dimensions of the upper duct portion 60U, the front duct portion 60F, and the center duct portion 60S are set to be equivalent to one another, and the length dimensions of the left and right side duct portions 60L, 60R are set to be larger than the length dimensions of the upper duct portion 60U, the front duct portion 60F, and the center duct portion 60S. The left and right side duct portions 60L, 60R, the upper duct portion 60U, the front duct portion 60F, and the center duct portion 60S internally communicate with one another. A duct-shaped inflator connector 60C extends from an intermediate point of the upper duct portion 60U in a long-side direction thereof toward the opposite side from the center duct portion 60S. The one end of the inflator 44 in the axial direction is connected to a leading end of the inflator connector 60C. Thus, the gas blown out from the inflator 44 is supplied into the frame-shaped duct 60 to inflate and deploy the frame-shaped duct 60.

The frame-shaped duct 60 is formed so as to surround the rear base fabric 62 and the bottom base fabric 64, and outer peripheral edges of the rear base fabric 62 and the bottom base fabric 64 are joined to the frame-shaped duct 60 by means such as sewing. The rear base fabric 62 closes a region surrounded by the upper duct portion 60U, the center duct portion 60S, and the left and right side duct portions 60L, 60R, while the bottom base fabric 64 closes a region surrounded by the front duct portion 60F, the center duct portion 60S, and the left and right side duct portions 60L, 60R. In the following description, parts of the left and right side duct portions 60L, 60R located on the side of the upper duct portion 60U from the center duct portion 60S will be referred to as vertical inflation parts 60L1, 60R1, while parts thereof on the side of the front duct portion 60F from the center duct portion 60S will be referred to as horizontal inflation parts 60L2, 60R2.

The left base fabric 66 and the right base fabric 68 each have a triangular shape of which two sides of the three sides are shorter than the other one side. Specifically, outer peripheral edges of the left base fabric 66 are composed of a long-side edge 66A and a pair of short-side edges 66B, 66C shorter than the long-side edge 66A. Similarly, outer peripheral edges of the right base fabric 68 are composed of a long-side edge 68A and a pair of short-side edges 68B, 68C shorter than the long-side edge 68A. The long-side edges 66A, 68A each constitute the other one side, and the short-side edges 66B, 66C and the short-side edges 68B, 68C each constitute the two sides. The short-side edges 66B, 68B of the left base fabric 66 and the right base fabric 68 are joined respectively to the vertical inflation parts 60L1, 60R1 of the left and right side duct portions 60L, 60R by means such as sewing. The short-side edges 66C, 68C of the left base fabric 66 and the right base fabric 68 are joined respectively to the horizontal inflation parts 60L2, 60R2 of the left and right side duct portions 60L, 60R by means such as sewing. The left base fabric 66 and the right base fabric 68 are configured such that the inflated and deployed frame-shaped duct 60 is bent into a substantially L-shape so as to protrude toward the rear lower side of the vehicle as seen from the vehicle width direction.

In the frame-shaped duct 60 thus inflated and deployed (bent), the upper duct portion 60U extends in the vehicle width direction and comes in contact with the upper end of the windshield 18, and the front duct portion 60F extends in the vehicle width direction and comes in contact with the lower end of the windshield. Moreover, in this inflated and deployed state of the frame-shaped duct 60 (i.e., the inflated and deployed state of the upper airbag 42), the center duct portion 60S extends in the vehicle width direction and is disposed below the upper duct portion 60U in the vehicle height direction or below and obliquely in front of the upper duct portion 60U in the vehicle height and length directions, and the front duct portion 60F is disposed in front of the center duct portion 60S in the vehicle length direction. Furthermore, in this inflated and deployed state, the rear base fabric 62 faces the head H of the passenger P from the front side of the vehicle, and the bottom base fabric 64 faces the left and right thighs (reference signs omitted) of the passenger P and the instrument panel 26 from the upper side in the vehicle height direction. The left and right vertical inflation parts 60L1, 60R1 extend in the vehicle height direction respectively on both sides of the rear base fabric 62 in the vehicle lateral direction, and the left and right horizontal inflation parts 60L2, 60R2 extend in the vehicle length direction respectively on both sides of the bottom base fabric 64 in the vehicle lateral direction.

In the above inflated and deployed state, the triangular left base fabric 66 and right base fabric 68 face each other in the vehicle width direction. The left base fabric 66 and the right base fabric 68 each assume such a position that the height dimension in the vehicle height direction decreases toward the front side of the vehicle as seen from the vehicle width direction, and the long-side edges 66A, 68A of the left base fabric 66 and the right base fabric 68 are disposed along the windshield 18. When seen from the vehicle width direction in the inflated and deployed state, the upper airbag 42 configured as has been described above has as a whole a substantially triangular shape (substantially wedge shape) of which the height dimension in the vehicle height direction decreases toward the front side of the vehicle. When the upper airbag 42 inflates and deploys, a front end of the roof head lining 22 deflects toward the lower side of the vehicle under the inflation pressure of the upper airbag 42.

Configuration of Front Passenger Seat Knee Airbag Device

The front passenger seat knee airbag device 50 includes the lower airbag (knee airbag) 52 that is installed at the front end of the vehicle cabin 14 below the windshield 18 in the vehicle height direction. In this embodiment, the lower airbag 52 is installed in the instrument panel reinforcement 28, and is provided independently and separately from the upper airbag 42. In other words, the lower airbag 52 is not integral with the upper airbag 42. The lower airbag 52 is configured to inflate and deploy during a frontal collision of the vehicle 12, toward the front side of the left and right lower legs LL, RL of the passenger P so as to be supported by the instrument panel 26 from the front side of the vehicle. The front passenger seat knee airbag device 50 includes an inflator (lower inflator) 54 that supplies a gas for inflating and deploying the lower airbag 52 to the lower airbag 52, and an airbag case 56. The airbag case 56 has a box shape opening toward the rear side of the vehicle, for example, and is disposed at a rear end inside the instrument panel 26 and fixed to the instrument panel reinforcement 28 through a bracket (not shown). Inside the airbag case 56, the lower airbag 52 in a folded state and the inflator 54 are housed.

The inflator 54 is of a cylinder type, and is disposed in a position with an axial direction thereof oriented along the vehicle width direction. The inflator 54 is fastened and fixed to the airbag case 56 by means such as bolt fastening. A gas blow-out portion (not shown) is provided at one end of the inflator 54 in the axial direction, and when the inflator 54 is actuated, the gas is blown out from this gas blow-out portion.

The lower airbag 52 is composed of a frame-shaped duct 60 as a frame-shaped inflation part that inflates and deploys so as to form a frame structure upon receiving gas supply from the inflator 54, and thus forms a framework of the lower airbag 52, and a plurality of base fabrics that is attached to the frame-shaped duct 60 and forms walls of the lower airbag 52. To simplify the description, those components of the upper airbag 42 and the lower airbag 52 that are basically the same are denoted by the same reference signs in FIG. 1 to FIG. 3. The lower airbag 52 has basically the same configuration as the upper airbag 42, and is composed of the frame-shaped duct 60 having a substantially B-shape, and a rear base fabric 62, a bottom base fabric 64, a left base fabric 66, and a right base fabric 68 attached to the frame-shaped duct 60. However, the lower airbag 52 is smaller than the upper airbag 42.

The one end of the inflator 54 in the axial direction is connected to an inflator connector 60C provided in the frame-shaped duct 60 of the lower airbag 52. Thus, the frame-shaped duct 60 of the lower airbag 52 inflates and deploys upon receiving gas supply from the inflator 54. In this inflated and deployed state, the upper duct portion 60U extends in the vehicle width direction and comes in contact with an upper end side of the lower surface 26B of the instrument panel 26, while the front duct portion 60F extends in the vehicle width direction and comes in contact with a lower end side of the lower surface 26B of the instrument panel 26. Moreover, in this inflated and deployed state, the center duct portion 60S extends in the vehicle width direction and is disposed below and obliquely in front of the upper duct portion 60U in the vehicle height and length directions, and the front duct portion 60F is disposed in front of the center duct portion 60S in the vehicle length direction or in front of and obliquely above the center duct portion 60S in the vehicle length and height directions. Furthermore, in this inflated and deployed state, the rear base fabric 62 faces the left and right lower legs LL, RL of the passenger P from the front side of the vehicle, and the bottom base fabric 64 faces the left and right feet (reference signs omitted) of the passenger P from the upper side of the vehicle. The left and right vertical inflation parts 60L1, 60R1 are disposed respectively on both sides of the rear base fabric 62 in the vehicle lateral direction, and assume a position of being slightly inclined rearward relative to the vehicle height direction. The left and right horizontal inflation parts 60L2, 60R2 are disposed respectively on both sides of the bottom base fabric 64 in the vehicle lateral direction, and assume a position of being slightly inclined upward on the front side relative to the vehicle length direction.

In the above inflated and deployed state, the triangular left base fabric 66 and right base fabric 68 face each other in the vehicle width direction. The left base fabric 66 and the right base fabric 68 each assume such a position that the height dimension in the vehicle height direction decreases toward the front side of the vehicle as seen from the vehicle width direction, and the long-side edges 66A, 68A of the left base fabric 66 and the right base fabric 68 are disposed along the lower surface 26B of the instrument panel 26. When seen from the vehicle width direction in the inflated and deployed state, the lower airbag 52 configured as has been described above has as a whole a substantially triangular shape (substantially wedge shape) of which the height dimension in the vehicle height direction decreases toward the front side of the vehicle. When the lower airbag 52 inflates and deploys, an airbag door (not shown) provided in the instrument panel 26 opens under the inflation pressure of the lower airbag 52.

Configuration of Control Device

The control device includes an airbag ECU (not shown), and a collision sensor (or a sensor group; not shown) that is electrically connected to this airbag ECU. The inflators 44, 54 are electrically connected to the airbag ECU. When the airbag ECU detects or foresees (predicts) a frontal collision of the vehicle 12 based on information from the collision sensor, the airbag ECU actuates the inflators 44, 54 at the same time or substantially at the same time. Examples of the frontal collision include symmetrical collisions (a head-on collision; a full-overlap frontal collision) as well as asymmetrical collisions such as an oblique collision and a small-overlap collision.

For example, an oblique collision (MDB oblique collision) is defined by NHTSA as a collision from an obliquely front side (e.g., a collision in which an angle relative to the collision partner is 15° and the amount of overlap with the collision partner in the vehicle width direction is approximately 35%). In this embodiment, an oblique collision at a relative speed of 90 km/hr is assumed as an example. For example, a small-overlap collision is defined by IIHS as a frontal collision in which the amount of overlap with the collision partner in the vehicle width direction is not larger than 25%. In this embodiment, a small-overlap collision at a relative speed of 64 km/hr is assumed as an example.

The vehicle 12 to which the passenger protection device 10 for a front passenger seat configured as has been described above is applied does not include a frontal collision airbag (front passenger seat airbag) that inflates and deploys from the front passenger seat 16, the front passenger seatbelt 17, or the instrument panel 26 during a frontal collision.

Workings and Effects

Next, the workings and effects of this embodiment will be described.

In the passenger protection device 10 for a front passenger seat configured as has been described above, when the airbag ECU detects or foresees a frontal collision of the vehicle 12 based on information from the collision sensor, the inflator 44 of the front passenger seat airbag device 40 and the inflator 54 of the front passenger seat knee airbag device 50 are actuated. Thus, the upper airbag 42 installed in the front header 20F inflates and deploys toward the front side of the head H of the passenger P, while the lower airbag 52 installed in the instrument panel reinforcement 28 inflates and deploys toward the front side of the left and right lower legs LL, RL of the passenger P.

Here, the lower airbag 52 inflates and deploys toward the front side of the left and right lower legs LL, RL that are located relatively close to the dashboard 24 among the body parts of the passenger P, and is supported by the instrument panel 26 from the front side of the vehicle. The left and right lower legs LL, RL of the passenger P can be restrained quickly and effectively by the lower airbag 52.

The upper airbag 42 inflates and deploys from the front header 20F disposed close to the head H of the passenger P, and is supported by the windshield 18 from the front side of the vehicle. Since the windshield 18 is joined at the upper end to the front header 20F, a large area of the windshield 18 in the height direction can be used as the support surface (reaction surface) for the upper airbag 42 that inflates and deploys from the front header 20F. Thus, even when the inclination of the windshield 18 is increased and the instrument panel 26 is downsized, a reaction surface for the upper airbag 42 can be easily secured, and the head H and the chest C of the passenger P can be restrained quickly and effectively by the upper airbag 42.

As has been described above, in this embodiment, it is possible to quickly restrain the left and right lower legs LL, RL by the lower airbag 52 so as to absorb the inertial energy of the passenger P, and at the same time to restrain the head H and the chest C with an adequate reaction force by the upper airbag 42 that inflates and deploys from the front header 20F and is supported by the windshield 18. Thus, even when the inclination of the windshield 18 is increased and the instrument panel 26 is downsized, the passenger restraining performance of the airbags (the upper airbag 42 and the lower airbag 52) can be easily secured.

In this embodiment, the upper airbag 42 and the lower airbag 52 each include the frame-shaped duct 60 that inflates and deploys so as to form a frame structure upon receiving gas supply from the inflator 44 or 54, and thus forms the framework of the airbag, and the base fabrics (rear base fabric 62, bottom base fabric 64, left base fabric 66, and right base fabric 68) that are attached to the frame-shaped duct 60 and form the walls of the airbag. The upper airbag 42 and the lower airbag 52 require the gas from the inflators 44, 54 to be supplied to only the frame-shaped ducts 60, which makes it possible to use low-power inflators 44, 54 while securing the volumes of the upper airbag 42 and the lower airbag 52 in the inflated and deployed state. As a result, for example, reductions in the cost of the inflators 44, 54 and in the installation space of the inflators 44, 54 can be achieved.

Moreover, in this embodiment, the frame-shaped ducts 60 of the upper airbag 42 and the lower airbag 52 are each formed so as to surround the rear base fabric 62 and the bottom base fabric 64. The left base fabric 66 and the right base fabric 68 each have a triangular shape of which the two sides of the three sides are shorter than the other one side, and the short-side edges 66B, 66C and the short-side edges 68B, 68C constituting these two sides are joined respectively to the left and right side portions (side duct portions 60L, 60R) of the frame-shaped duct 60. With such left base fabric 66 and right base fabric 68, the inflated and deployed frame-shaped duct 60 is bent so as to protrude toward the rear lower side of the vehicle as seen from the vehicle width direction.

When seen from the vehicle width direction in the inflated and deployed state of the frame-shaped duct 60, the upper airbag 42 that is formed by the frame-shaped duct 60 and the base fabrics as described above has a substantially triangular shape of which the height dimension in the vehicle height direction decreases toward the front side of the vehicle. This allows the upper airbag 42 to be easily supported on a larger area of the windshield 18.

Similarly, when seen from the vehicle width direction in the inflated and deployed state of the frame-shaped duct 60, the lower airbag 52 that is formed by the frame-shaped duct 60 and the base fabrics as described above has a substantially triangular shape of which the height dimension in the vehicle height direction decreases toward the front side of the vehicle. This allows the lower airbag 52 to be easily supported on a larger area of the lower surface 26B of the downsized instrument panel 26 that faces the left and right lower legs LL, RL of the passenger P, even when the rearward inclination of the lower surface 26B is set to a large angle.

With the upper airbag 42 and the lower airbag 52 configured as has been described above, the triangular shapes of the left base fabric 66 and the right base fabric 68 can be appropriately changed to thereby change the bending angle of the frame-shaped duct 60. Thus, the frame-shaped duct 60 can be shared among vehicles having different angles of rearward inclination of the windshield 18.

Figure 4:
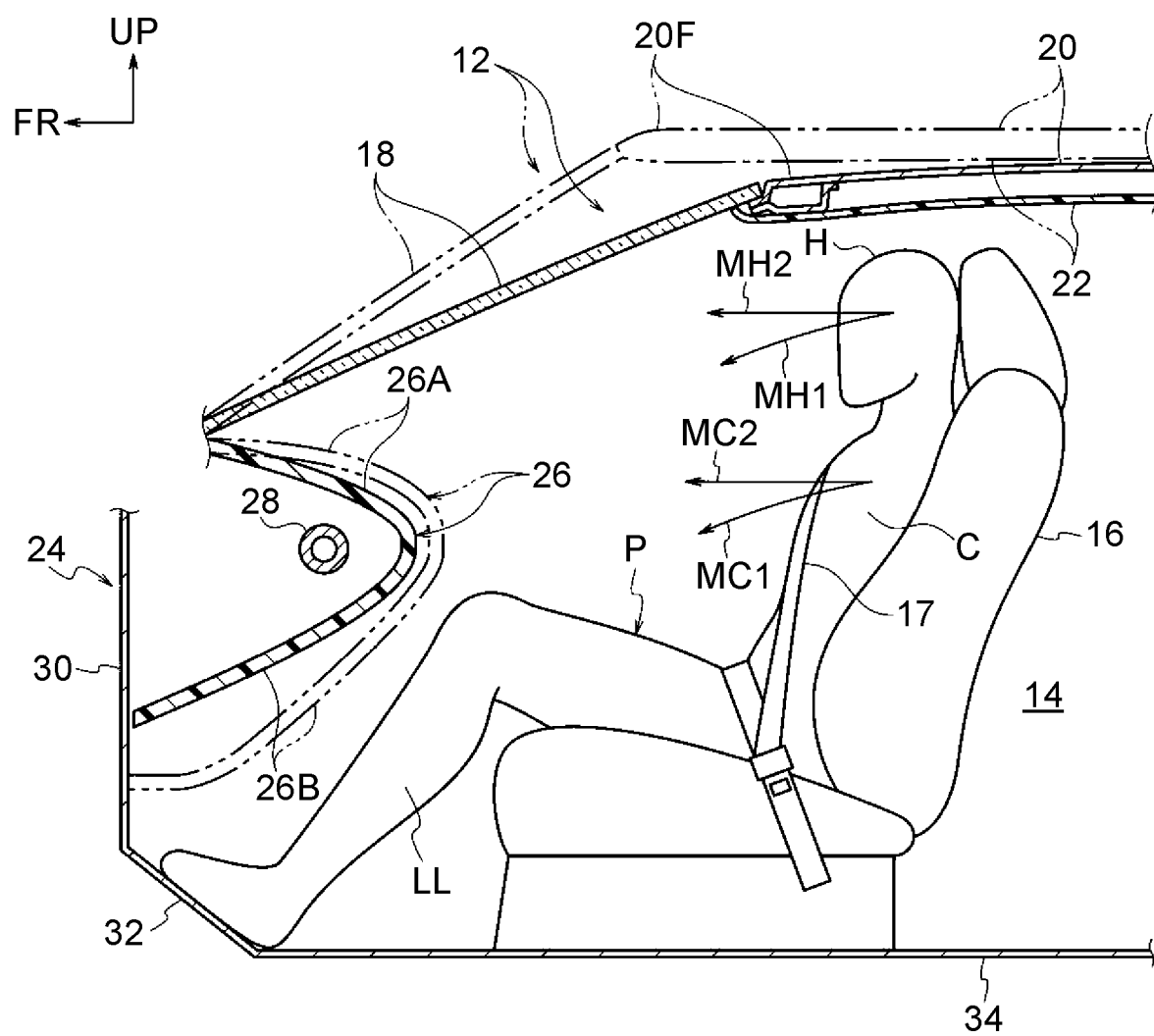
FIG. 4 is a partial sectional view corresponding to FIG. 2, illustrating a vehicle in which the inclination of a windshield is set to a large angle and an instrument panel is downsized.
Figure 5:
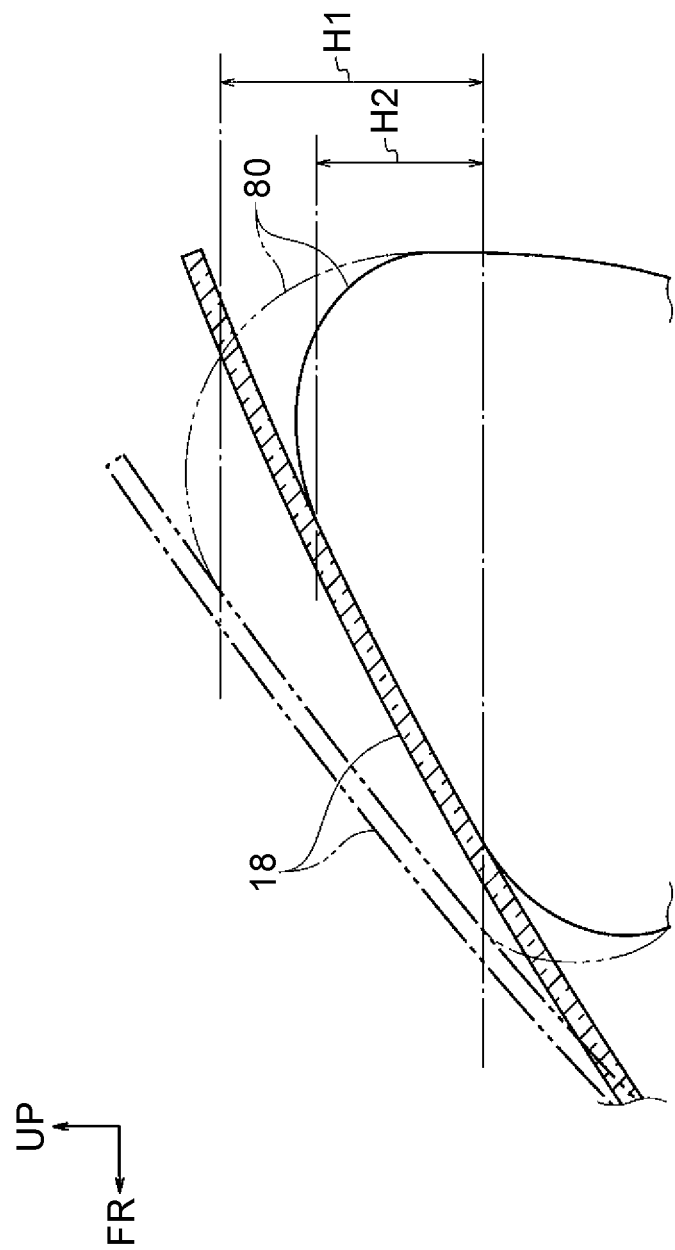
FIG. 5 is a sectional view corresponding to a part of FIG. 4, illustrating a relationship between the inclination of the windshield and a reaction surface for a front passenger seat airbag.
Figure 6:
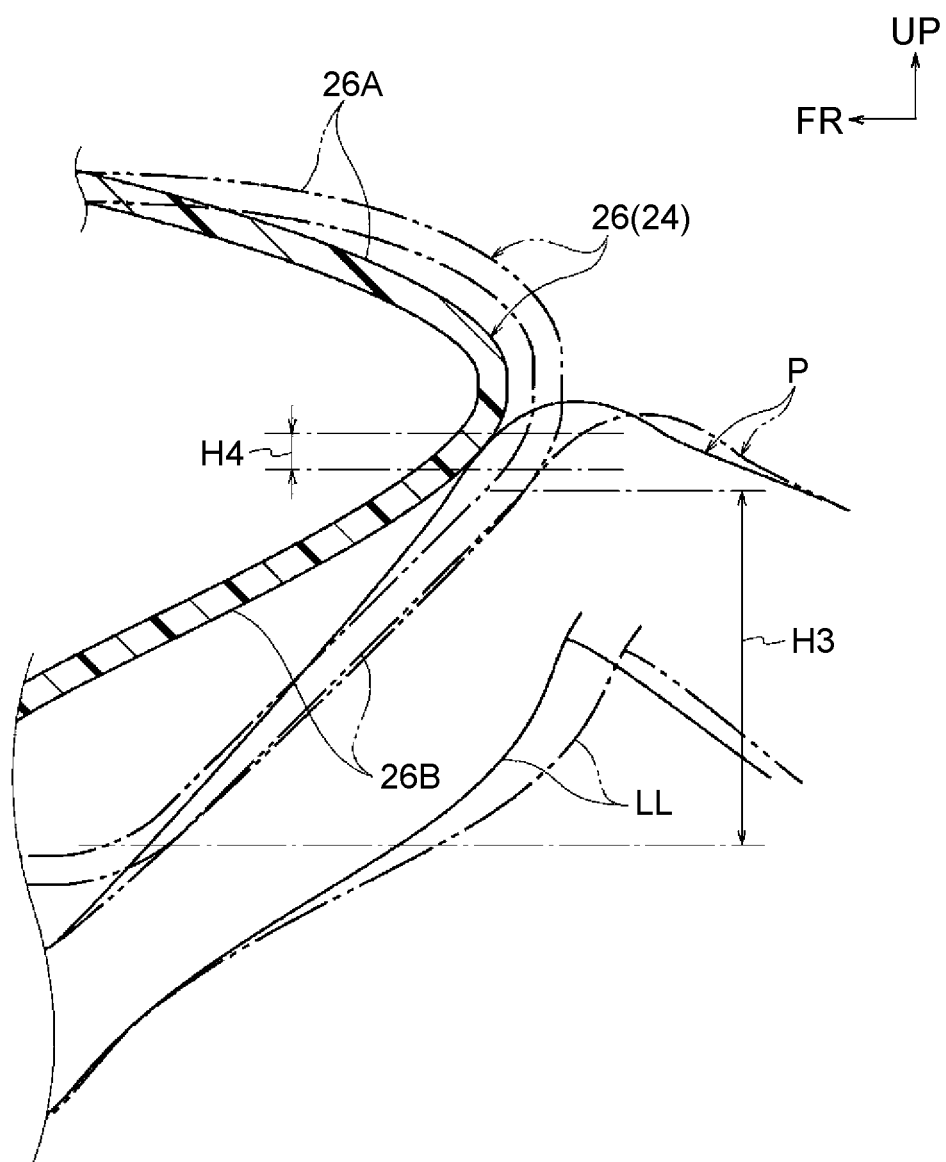
FIG. 6 is a sectional view corresponding to a part of FIG. 4, illustrating a relationship between downsizing of the instrument panel and a reaction surface for a knee airbag.

The above-described effects will be supplementarily described using FIG. 4 to FIG. 6. FIG. 4 shows a configuration similar to that of the front part of the vehicle cabin 14 according to this embodiment. In FIG. 4 and FIG. 5, the windshield 18 and the roof 20 indicated by the two-dot dashed lines are examples of conventional windshield and roof. In FIG. 4 and FIG. 6, the instrument panel 26 indicated by the two-dot dashed lines is an example of a conventional instrument panel. In FIG. 5, an airbag 80 indicated by the solid line and the two-dot dashed line is an example of a frontal collision airbag that inflates and deploys from the instrument panel 26. In FIG. 4, the arrows MH1, MC1 indicate the directions of movement of the head H and the chest C, respectively, in the case of a frontal collision of the vehicle 12 with the passenger P wearing the front passenger seatbelt 17. In FIG. 4, the arrows MH2, MC2 indicate the directions of movement of the head H and the chest C, respectively, in the case of a frontal collision of the vehicle 12 without the passenger P wearing the front passenger seatbelt 17.

Here, in the configuration in which the inclination of the windshield 18 is set to a larger angle than in a conventional vehicle as in this embodiment, when the passenger P is not wearing the front passenger seatbelt 17, it is difficult to secure in the windshield 18 a sufficient reaction surface for the airbag 80 (see FIG. 5) that inflates and deploys from the instrument panel 26. Specifically, when the passenger P is not wearing the front passenger seatbelt 17 during a frontal collision, the airbag 80 is required to absorb larger inertial energy of the head H and the chest C. Moreover, the width in the height direction (the dimension in the vehicle height direction) of the reaction surface in the windshield 18 for the airbag 80 is smaller when the inclination angle of the windshield 18 is larger (see the solid lines in FIG. 4 and FIG. 5) than when the inclination angle of the windshield 18 is smaller (see the two-dot dashed lines in FIG. 4 and FIG. 5) (H1>H2 in FIG. 5). This makes it difficult to secure in the windshield 18 a sufficient reaction surface for the airbag 80. In this embodiment, however, the upper airbag 42 inflates and deploys from the front header 20F, which allows the width in the height direction of the reaction surface in the windshield 18 for the upper airbag 42 to be easily increased toward the upper side of the vehicle, so that a reaction surface for the upper airbag 42 can be easily secured in the windshield 18. Thus, the passenger restraining performance of the upper airbag 42 can be easily secured even when the passenger P is not wearing the front passenger seatbelt 17 during a frontal collision.

The width in the height direction (the dimension in the vehicle height direction) of the reaction surface for the knee airbag (not shown in FIG. 4 and FIG. 6) is smaller in the instrument panel 26 that is downsized as in this embodiment (see the solid lines in FIG. 4 and FIG. 6) than in the conventional large-sized instrument panel 26 (see the two-dot dashed lines in FIG. 4 and FIG. 6) (H3>H4 in FIG. 6). In this embodiment, however, the inflated and deployed lower airbag 52 has a substantially triangular shape of which the height dimension in the vehicle height direction decreases toward the front side of the vehicle as seen from the vehicle width direction. This allows the lower airbag 52 to be easily supported on a larger area of the lower surface 26B of the downsized instrument panel 26 that faces the left and right lower legs LL, RL of the passenger P, even when the rearward inclination of the lower surface 26B is set to a large angle.

Next, a second embodiment of the present disclosure will be described. Those components and workings that are basically the same as in the first embodiment will be denoted by the same reference signs as in the first embodiment while description thereof will be omitted.

Second Embodiment

Figure 7:
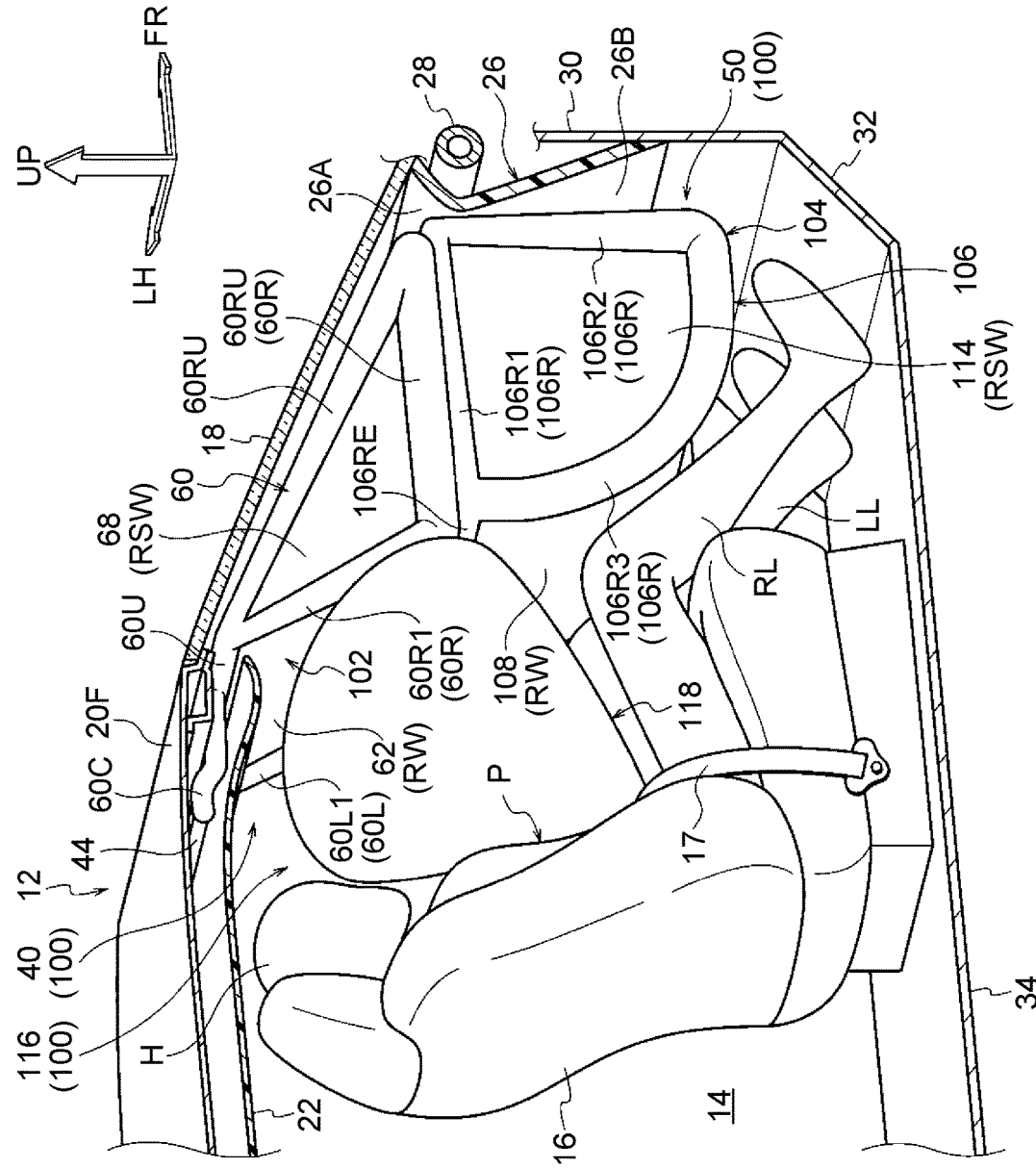
FIG. 7 is a partial sectional view of a front part of a cabin of a vehicle to which a passenger protection device for a front passenger seat according to a second embodiment of the present disclosure is applied, as seen from an obliquely rear right side of the vehicle, showing an inflated and deployed state of an upper airbag and a lower airbag.
Figure 8:
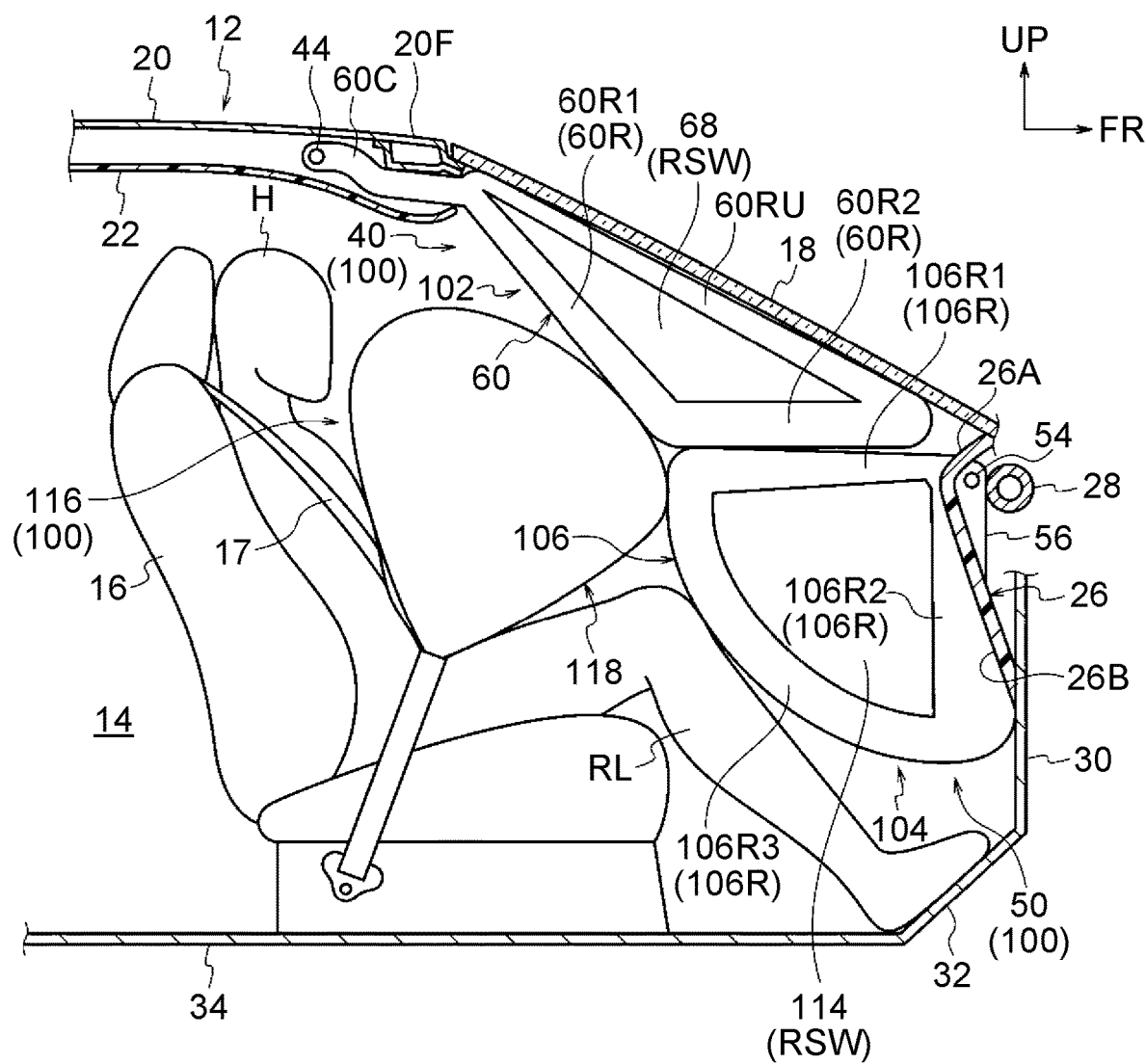
FIG. 8 is a partial sectional view of the configuration shown in FIG. 7, as seen from a right side of the vehicle.

FIG. 7 is a partial sectional view of a front part of the vehicle cabin 14 of the vehicle 12 to which a passenger protection device 100 for a front passenger seat according to the second embodiment of the present disclosure is applied, as seen from an obliquely rear right side of the vehicle. FIG. 8 is a partial sectional view of the configuration shown in FIG. 7, as seen from the right side of the vehicle.

Configuration

The vehicle 12 according to this embodiment has basically the same configuration as the vehicle 12 according to the first embodiment. However, the instrument panel 26 according to this embodiment is downsized (thinned) with the dimension in the vehicle length direction reduced from that of the instrument panel 26 according to the first embodiment.

Like the passenger protection device 10 for a front passenger seat according to the first embodiment, the passenger protection device 100 for a front passenger seat according to this embodiment includes an upper airbag 102 that is installed in the front header 20F and a lower airbag 104 that is installed in the instrument panel reinforcement 28. However, the upper airbag 102 and the lower airbag 104 according to this embodiment are different in configuration from the upper airbag 42 and the lower airbag 52 according to the first embodiment.

Figure 10:
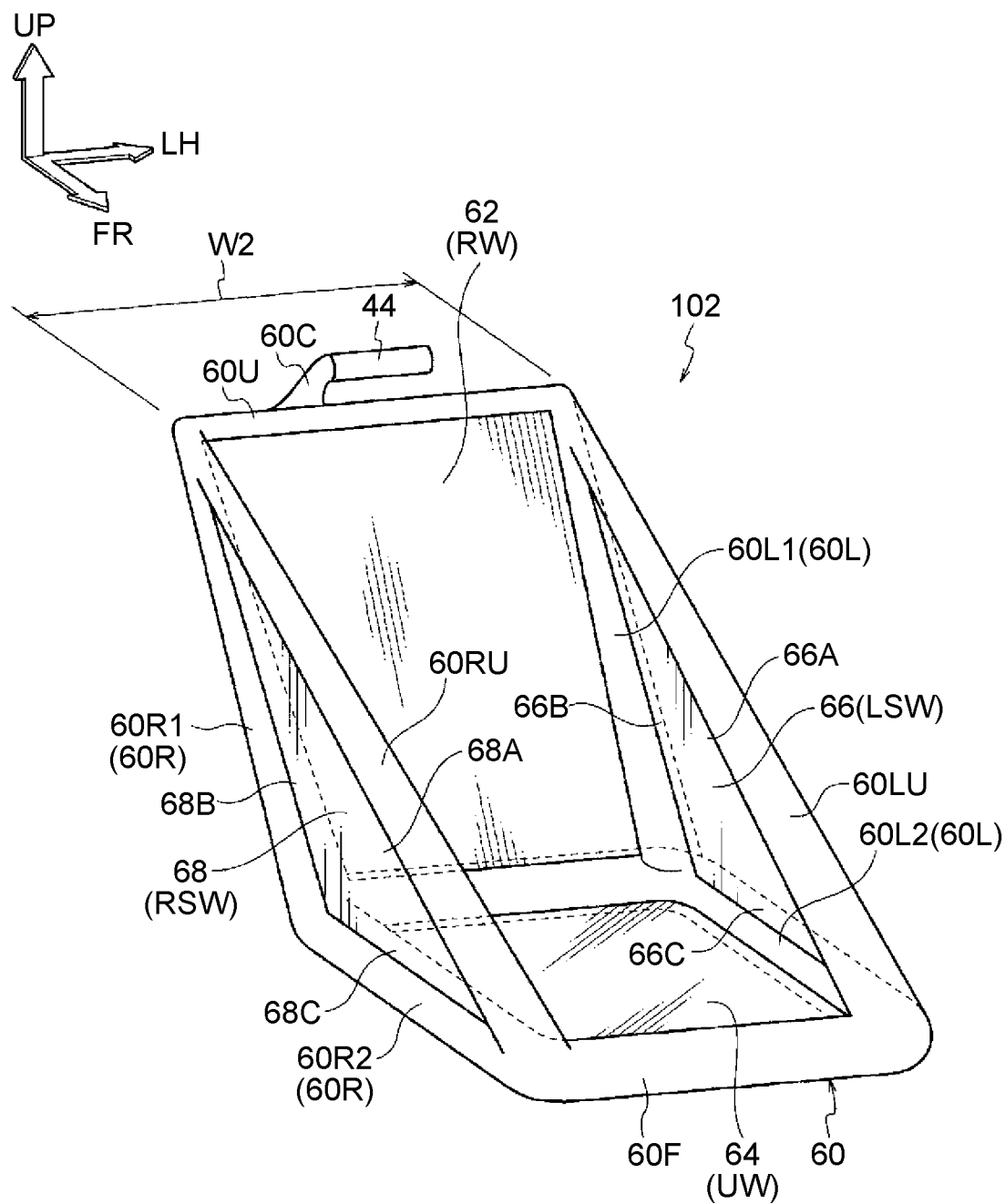
FIG. 10 is a perspective view showing the upper airbag according to the second embodiment.

The upper airbag 102 is similar in configuration to the upper airbag 42 according to the first embodiment. As shown in FIG. 10, the upper airbag 102 includes the frame-shaped duct 60 as a frame-shaped inflation part that inflates and deploys so as to form a frame structure upon receiving gas supply from the inflator 44, and thus forms a framework of the upper airbag 102, and the base fabrics (rear base fabric 62, bottom base fabric 64, left base fabric 66, and right base fabric 68) that are attached to the frame-shaped duct 60 and form walls of the upper airbag 102. Like the frame-shaped duct 60 of the first embodiment, the frame-shaped duct 60 of the upper airbag 102 includes the left and right side duct portions 60L, 60R, the upper duct portion 60U, the front duct portion 60F, and the center duct portion 60S. This frame-shaped duct 60 further includes left and right upper side duct portions 60LU, 60RU that respectively link together both ends of the left and right side duct portions 60L, 60R in the long-side direction. The left and right upper side duct portions 60LU, 60RU, the left and right side duct portions 60L, 60R, the upper duct portion 60U, the front duct portion 60F, and the center duct portion 60S internally communicate with one another. The long-side edges 66A, 68A of the left base fabric 66 and the right base fabric 68 are joined respectively to the left and right upper side duct portions 60LU, 60RU by means such as sewing. In the inflated and deployed state of the frame-shaped duct 60, the upper side duct portions 60LU, 60RU come in contact with the windshield 18.

Figure 9:
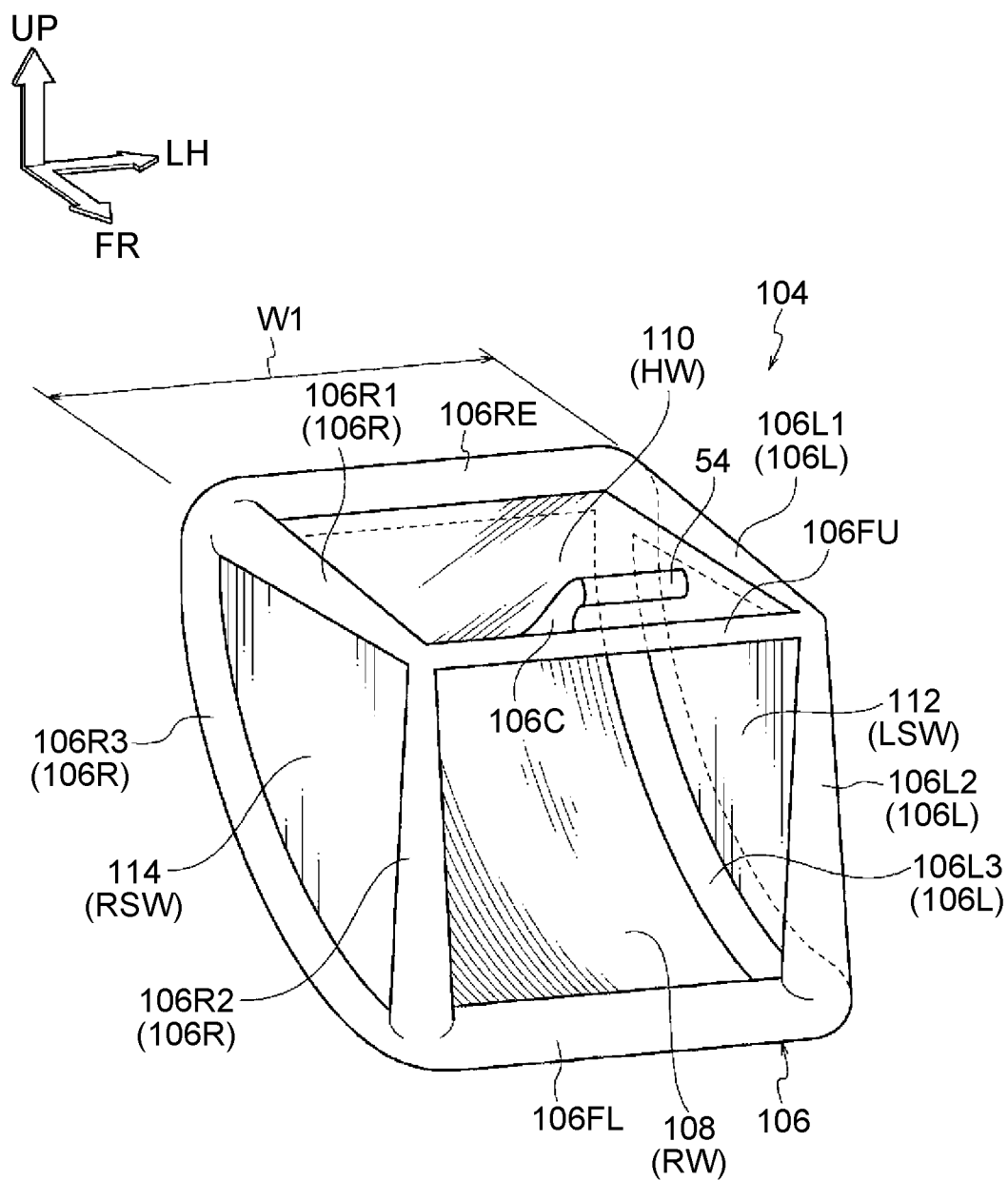
FIG. 9 is a perspective view showing the lower airbag according to the second embodiment.

As shown in FIG. 9, the lower airbag 104 includes a frame-shaped duct 106 as a frame-shaped inflation part that inflates and deploys so as to form a frame structure upon receiving gas supply from the inflator 54, and thus forms a framework of the lower airbag 104, and a plurality of base fabrics (rear base fabric 108, top base fabric 110, left base fabric 112, and right base fabric 114) that is attached to the frame-shaped duct 106 and forms walls of the lower airbag 104. The frame-shaped duct 106 includes duct-shaped left and right side duct portions 106L, 106R that each inflate and deploy so as to form a substantially rectangular (fan-shaped) frame as seen from the vehicle width direction, and are disposed side by side in the vehicle width direction. In the inflated and deployed state, the left and right side duct portions 106L, 106R are composed of: left and right upper side duct portions 106L1, 106R1 that extend in the vehicle length direction; left and right front side duct portions 106L2, 106R2 that extend from front ends of the left and right upper side duct portions 106L1, 106R1 toward the lower side of the vehicle; a left rear side duct portion 106L3 that links together a rear end of the left upper side duct portion 106L1 and a lower end of the left front side duct portion 106L2; and a right rear side duct portion 106R3 that links together a rear end of the right upper side duct portion 106R1 and a lower end of the right front side duct portion 106R2.

The frame-shaped duct 106 further includes: a duct-shaped rear duct portion 106RE that links together the rear ends of the left and right upper side duct portions 106L1, 106R1; a duct-shaped front upper duct portion 106FU that links together front ends of the left and right upper side duct portions 106L1, 106R1; and a duct-shaped front lower duct portion 106FL that links together the lower ends of the left and right front side duct portions 106L2, 106R2. The left and right side duct portions 106L, 106R, the rear duct portion 106RE, the front upper duct portion 106FU, and the front lower duct portion 106FL internally communicate with one another. A duct-shaped inflator connector 106C extends from the front upper duct portion 106FU. The one end of the inflator 54 in the axial direction is connected to a leading end of the inflator connector 106C. Thus, the gas blown out from the inflator 54 is supplied into the frame-shaped duct 106 to inflate and deploy the frame-shaped duct 106.

The rear base fabric 108 is a member that forms the rear wall RW of the lower airbag 104 and has an elongated rectangular shape or a substantially elongated rectangular shape. The rear base fabric 108 closes a region surrounded by the left and right rear side duct portions 106L3, 106R3, the rear duct portion 106RE, and the front lower duct portion 106FL, and outer peripheral edges of the rear base fabric 108 are joined to these duct portions 106L3, 106R3, 106RE, 106FL by means such as sewing. The top base fabric 110 is a member that forms a top wall HW of the lower airbag 104 and has a rectangular shape or a substantially rectangular shape. The top base fabric 110 closes a region surrounded by the left and right upper side duct portions 106L1, 106R1, the front upper duct portion 106FU, and the rear duct portion 106RE, and outer peripheral edges of the top base fabric 110 are joined to these duct portions 106L1, 106R1, 106FU, 106RE by means such as sewing.

The left base fabric 112 is a member that forms the left wall LSW of the lower airbag 104, and the right base fabric 114 is a member that forms the right wall RSW of the lower airbag 104. The left base fabric 112 and the right base fabric 114 each have a fan shape or a substantially fan shape. The left base fabric 112 and the right base fabric 114 respectively close regions surrounded by the left and right side duct portions 106L, 106R, and outer peripheral edges of the left base fabric 112 and the right base fabric 114 are joined respectively to the left and right side duct portions 106L, 106R by means such as sewing. The top base fabric 110 closes the region surrounded by the left and right upper side duct portions 106L1, 106R1, the front upper duct portion 106FU, and the rear duct portion 106RE, and the outer peripheral edges of the top base fabric 110 are joined to these duct portions 106L1, 106R1, 106FU, 106RE by means such as sewing.

In the inflated and deployed state of the frame-shaped duct 106 (i.e., the inflated and deployed state of the lower airbag 104), the left and right rear side duct portions 106L3, 106R3 and the rear base fabric 108 curve so as to protrude toward the rear lower side of the vehicle, so that the lower airbag 104 assumes a substantially fan shape as seen from the vehicle width direction. In this inflated and deployed state, the left and right front side duct portions 106L2, 106R2, the front upper duct portion 106FU, and the front lower duct portion 106FL are supported by the instrument panel 26 and the dashboard panel 30 (i.e., the dashboard 24) from the front side of the vehicle.

Figure 11:
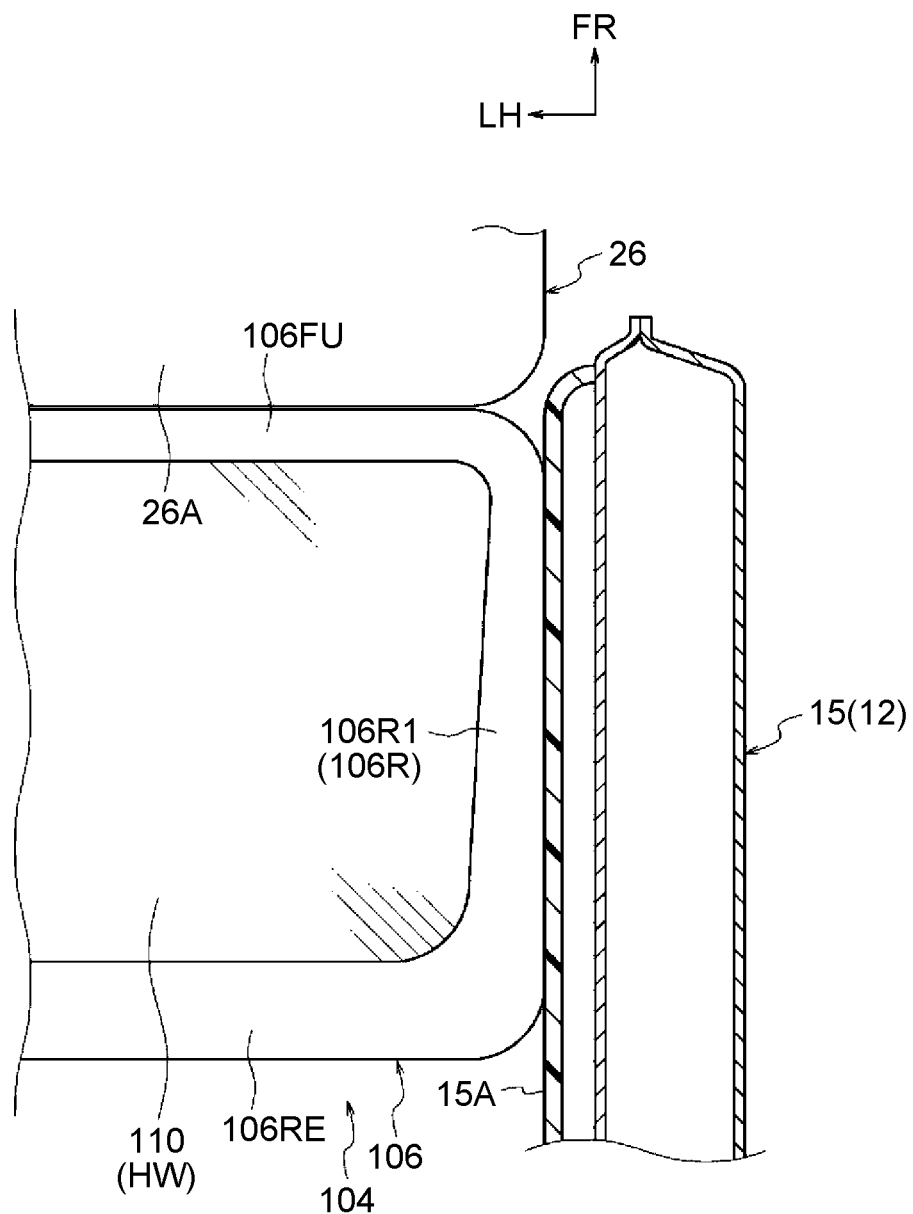
FIG. 11 is a sectional plan view showing the configuration of a periphery including the lower airbag according to the second embodiment.

In the inflated and deployed state of the upper airbag 102 and the lower airbag 104 configured as has been described above, the center of the upper airbag 102 in the vehicle width direction, the center of the lower airbag 104 in the vehicle width direction, and the center of the front passenger seat 16 in the vehicle width direction coincide or substantially coincide with one another. The inflated and deployed upper airbag 102 and lower airbag 104 come in contact with each other in the height direction without the passenger P being restrained. In this embodiment, a dimension W1 in the vehicle width direction of the lower airbag 104 in the inflated and deployed state (see FIG. 9) is set to be larger than a width W2 in the vehicle width direction of the upper airbag 102 in the inflated and deployed state (see FIG. 10). Moreover, in this embodiment, the output power of the inflators 44, 54 is set such that the internal pressure (maximum internal pressure) of the frame-shaped duct 106 of the lower airbag 104 in the inflated and deployed state is higher than the internal pressure (maximum internal pressure) of the frame-shaped duct 60 of the upper airbag 102 in the inflated and deployed state. As shown in FIG. 11, a side surface of the inflated and deployed lower airbag 104 on the outer side in the vehicle width direction (here, the side duct portion 106R) comes in contact with a door trim 15A of a side door 15 of the vehicle 12.

The passenger protection device 100 for a front passenger seat according to this embodiment further includes a frontal collision airbag 118 that is installed in the front passenger seatbelt 17. The frontal collision airbag 118 is a constituent member of an airbelt device 116, and is configured to be mounted in the front passenger seatbelt 17 in a folded state. One end of a tube (not shown) is connected to the frontal collision airbag 118, and the other end of this tube is connected to an inflator (not shown) installed in the front passenger seat 16 etc. This inflator is electrically connected to the airbag ECU, and is actuated when the airbag ECU detects or foresees a frontal collision. When this inflator is actuated, a gas is supplied into the frontal collision airbag 118 through the tube, so that the frontal collision airbag 118 inflates and deploys toward the front side of the upper body (head H, chest C, and abdomen B) of the passenger P. In this case, the upper airbag 102 and the lower airbag 104 also inflate and deploy, so that the inflated and deployed frontal collision airbag 118 is interposed between the upper airbag 102 and the lower airbag 104 on one side and the upper body of the passenger P on the other. Thus, when inflated and deployed, the frontal collision airbag 118 is located between the upper airbag 102 and the lower airbag 104 on one side and the backrest 16A of the front passenger seat 16 on the other. However, the frontal collision airbag 118 is not limited to being installed in the front passenger seatbelt 17 and may instead be installed in the front passenger seat 16.

Workings and Effects

Next, the workings and effects of this embodiment will be described.

In the passenger protection device 100 for a front passenger seat according to this embodiment, when the airbag ECU detects or foresees a frontal collision of the vehicle 12 based on information from the collision sensor, the inflator 44 of the front passenger seat airbag device 40, the inflator 54 of the front passenger seat knee airbag device 50, and the inflator of the airbelt device 116 are actuated. As a result, the upper airbag 42 installed in the front header 20F inflates and deploys toward the front side of the head H of the passenger P, the lower airbag 104 installed in the instrument panel reinforcement 28 inflates and deploys toward the front side of the left and right lower legs LL, RL of the passenger P, and the frontal collision airbag 118 inflates and deploys between the upper airbag 102 and the lower airbag 104 on one side and the upper body of the passenger P on the other.

Thus, the left and right lower legs LL, RL of the passenger P are restrained quickly and effectively by the lower airbag 104, and at the same time, with the upper airbag 102 and the lower airbag 104 functioning as reaction surfaces for the frontal collision airbag 118, the upper body of the passenger P is restrained by these airbags 102, 104, 118. In this case, as in the first embodiment, the upper airbag 102 having inflated and deployed from the front header 20F is supported on a large area of the windshield 18 in the height direction. Moreover, in this case, the lower airbag 104 having inflated and deployed from the instrument panel reinforcement 28 is supported on a large area of the instrument panel 26 and the dashboard panel 30 (i.e., the dashboard 24) in the height direction. Thus, even when the inclination of the windshield 18 is increased and the instrument panel 26 is downsized, the passenger restraining performance of the airbags (upper airbag 102, lower airbag 104, and frontal collision airbag 118) can be easily secured.

Moreover, in this embodiment, the frontal collision airbag 118 inflates and deploys between the inflated and deployed upper airbag 102 and lower airbag 104 and the upper body of the passenger P. Thus, the performance of restraining the passenger P can be secured even when the passenger P is seated at a distance from the inflated and deployed upper airbag 102 and lower airbag 104 toward the rear side of the vehicle.

Like the upper airbag 42 and the lower airbag 52 according to the first embodiment, the upper airbag 102 and the lower airbag 104 according to this embodiment are composed of the frame-shaped ducts 60, 106, respectively, and the base fabrics attached to the frame-shaped ducts 60, 106. Thus, as in the first embodiment, reductions in the cost of the inflators 44, 54 and in the installation space of the inflators 44, 54 can be achieved.

Furthermore, in this embodiment, the inflated and deployed upper airbag 102 and the inflated and deployed lower airbag 104 come in contact with each other in the height direction without the passenger P being restrained. Here, during a frontal collision of the vehicle 12, the upper body of the passenger P wearing the front passenger seatbelt 17 assumes a forward inclined posture, so that the head H of the passenger P comes in contact with the upper airbag 102 in a direction toward an obliquely front lower side of the vehicle. Since the upper airbag 102 and the lower airbag 104 are in contact with each other in the height direction, the head H is restrained also by the lower airbag 104 through the upper airbag 102. As a result, the performance of restraining the head H can be further enhanced.

In this embodiment, the internal pressure of the lower airbag 104 in the inflated and deployed state is set to be higher than the internal pressure of the upper airbag 102 in the inflated and deployed state. Thus, the left and right lower legs LL, RL of the passenger P can be effectively restrained by the lower airbag 104. Moreover, when the head H of the passenger P comes in contact with the upper airbag 102 in a direction toward an obliquely front lower side, the head H is gently restrained by the upper airbag 102 and at the same time restrained by the lower airbag 104 through the upper airbag 102. Thus, the head H can be effectively restrained.

Moreover, in this embodiment, the dimension W1 in the vehicle width direction of the lower airbag 104 in the inflated and deployed state is set to be larger than the dimension W2 in the vehicle width direction of the upper airbag 102 in the inflated and deployed state. Thus, the upper airbag 102 coming in contact with the lower airbag 104 is stably supported by the lower airbag 104. Therefore, for example, even when the form of the frontal collision of the vehicle 12 is an asymmetrical collision, such as an oblique collision or a small-overlap collision, and the head H of the passenger P comes in contact with the upper airbag 102 by moving toward an obliquely front lower side, the upper airbag 102 can be restricted by the lower airbag 104 from inclining in the direction of movement of the head H. As a result, the performance of restraining the head H during an asymmetrical collision can be enhanced.

In this embodiment, the side surface of the inflated and deployed lower airbag 104 on the outer side in the vehicle width direction (here, the side duct portion 106R) comes in contact with the door trim 15A of the side door 15. Thus, for example, even when the form of the frontal collision of the vehicle 12 is an asymmetrical collision, such as an oblique collision or a small-overlap collision, and the left and right lower legs LL, RL of the passenger P come in contact with the lower airbag 104 by moving obliquely toward the front side of the vehicle and the outer side in the vehicle width direction, the lower airbag 104 can be prevented from being displaced toward the outer side in the vehicle width direction. As a result, the performance of restraining the left and right lower legs LL, RL during an asymmetrical collision can be enhanced.

Supplemental Description of Embodiments

In the second embodiment, the side surface of the inflated and deployed lower airbag 104 on the outer side in the vehicle width direction comes in contact with the door trim 15A. However, the present disclosure is not limited to this example. The side surface of the inflated and deployed lower airbag 104 on the outer side in the vehicle width direction may be disposed at a distance from the door trim 15A.

In the second embodiment, the dimension W1 in the vehicle width direction of the lower airbag 104 in the inflated and deployed state is set to be larger than the dimension W2 in the vehicle width direction of the upper airbag 102 in the inflated and deployed state. However, the present disclosure is not limited to this example. The dimension W2 may be set to be larger than the dimension W1, or the dimensions W1, W2 may be set to be equivalent to each other.

In the second embodiment, the internal pressure of the lower airbag 104 in the inflated and deployed state is set to be higher than the internal pressure of the upper airbag 102 in the inflated and deployed state. However, the present disclosure is not limited to this example. The internal pressure of the upper airbag 102 in the inflated and deployed state may be set to be higher than the internal state of the lower airbag 104 in the inflated and deployed state, or the internal pressure of the upper airbag 102 in the inflated and deployed state and the internal pressure of the lower airbag 104 in the inflated and deployed state may be set to be equivalent to each other.

In the second embodiment, the inflated and deployed upper airbag 102 and lower airbag 104 come in contact with each other in the height direction without the passenger P being restrained. However, the present disclosure is not limited to this example. That is, the inflated and deployed upper airbag 102 and the inflated and deployed lower airbag 104 may be disposed at a distance from each other in the height direction without the passenger P being restrained.

In the second embodiment, the frontal collision airbag 118 inflates and deploys between the upper airbag 102 and the lower airbag 104 on one side and the upper body of the passenger P on the other. However, the present disclosure is not limited to this example. That is, the frontal collision airbag can inflate and deploy between the upper body of the passenger and at least one of the upper airbag and the lower airbag.

In the first embodiment, the upper airbag 42 and the lower airbag 52 each include the frame-shaped duct 60 and the base fabrics (rear base fabric 62, bottom base fabric 64, left base fabric 66, and right base fabric 68). However, the present disclosure is not limited to this example. At least one of the upper airbag 42 and the lower airbag 52 may be formed as a simple bag body. However, also in this case, it is preferable that the inflated and deployed upper airbag 42 and lower airbag 52 each have a substantially triangular shape (substantially wedge shape) of which the height dimension in the vehicle height direction decreases toward the front side of the vehicle as seen from the vehicle width direction. For example, a tether or a strap can be attached inside the bag body to form the bag body into such a shape. The same applies to the upper airbag 102 according to the second embodiment.

In the first embodiment, the inflated and deployed lower airbag 52 is supported by the lower surface 26B of the instrument panel 26 but not supported by the dashboard panel 30. However, the present disclosure is not limited to this example. That is, in the first embodiment, the inflated and deployed lower airbag 52 may be supported not only by the lower surface 26B of the instrument panel 26 but also by the dashboard panel 30. In the first embodiment, as in the second embodiment, the inflated and deployed upper airbag 42 and lower airbag 52 may come in contact with each other in the height direction without the passenger P being restrained.

In each of the embodiments, the lower airbag 52 or 104 is installed in the instrument panel reinforcement 28. However, the present disclosure is not limited to this example. For example, in a case where a cross member (frame member) extending in the vehicle width direction is provided in the dashboard 24, the lower airbag may be installed in this cross member.

In addition, the present disclosure can be implemented with various modifications made thereto within the scope of the gist of the disclosure. It should be understood that the scope of the right of the present disclosure is not limited to the above embodiments.

What is claimed is:

1. A passenger protection device for a front passenger seat, the passenger protection device comprising:
   an upper airbag that is:
      installed in a front header provided at a front end of a roof of a vehicle, and is configured to inflate and deploy at a time of a frontal collision of a vehicle;

configured to be supported by a windshield from a front side of the vehicle when the upper airbag inflates and deploys at the time of the frontal collision of the vehicle; and configured so that, when viewed from a vehicle lateral side in the inflated and deployed state, (i) an outer perimeter of the upper airbag has a substantially triangular shape of which a height dimension in a vehicle height direction decreases toward the front side of the vehicle, (ii) a bottom edge of the upper airbag is substantially parallel to a floor of the vehicle, and (iii) a rear surface of the upper airbag faces a head of a front passenger from the front side of the vehicle; and a lower airbag that is provided separately from the upper airbag and installed at a front end of a vehicle cabin below the windshield of the vehicle in the vehicle height direction, the lower airbag being configured to inflate and deploy at the time of the frontal collision so as to be supported by a dashboard including an instrument panel from the front side of the vehicle, wherein when the upper airbag and the lower airbag are in an inflated state, a side of the upper airbag facing a rear of the vehicle is closer to the rear of the vehicle than a side of the lower airbag facing the rear of the vehicle, the upper airbag is configured to inflate and deploy toward a front side of a head of a front passenger at the time of the frontal collision, and the lower airbag is configured to inflate and deploy toward a front side of left and right lower legs of the front passenger at the time of the frontal collision.

2. The passenger protection device according to claim 1, wherein:

the upper airbag and the lower airbag are each configured to inflate and deploy so as to form a frame structure upon receiving gas supply respectively from an inflator;

the upper airbag has a first frame-shaped inflation part that forms a framework of the upper airbag, and a plurality of first base fabrics, the plurality of first base fabrics being attached to the first frame-shaped inflation part and forming first walls of the upper airbag; and the lower airbag has a second frame-shaped inflation part that forms a framework of the lower airbag, and a plurality of second base fabrics, the plurality of second base fabrics being attached to the second frame-shaped inflation part and forming second walls of the lower airbag.

3. The passenger protection device according to claim 2, wherein:

the plurality of first base fabrics include a first rear base fabric, a first bottom base fabric, a first left base fabric, and a first right base fabric that form a rear wall, a bottom wall, a left wall, and a right wall of the upper airbag, respectively;

the first frame-shaped inflation part is formed so as to surround the first rear base fabric and the first bottom base fabric; and the first left base fabric and the first right base fabric each have a triangular shape of which two sides of three sides are shorter than the other one side, and edges constituting the two sides of the first left base fabric and edges constituting the two sides of the first right base fabric are joined respectively to left and right side portions of the first frame-shaped inflation part such that the inflated and deployed first frame-shaped inflation part is bent so as to protrude toward a rear lower side of the vehicle as seen from a vehicle width direction, and the plurality of second base fabrics include a second rear base fabric, a second bottom base fabric, a second left base fabric, and a second right base fabric that form a rear wall, a bottom wall, a left wall, and a right wall of the lower airbag, respectively;

the second frame-shaped inflation part is formed so as to surround the second rear base fabric and the second bottom base fabric; and the second left base fabric and the second right base fabric each have a triangular shape of which two sides of three sides are shorter than the other one side, and edges constituting the two sides of the second left base fabric and edges constituting the two sides of the second right base fabric are joined respectively to left and right side portions of the second frame-shaped inflation part such that the inflated and deployed second frame-shaped inflation part is bent so as to protrude toward a rear lower side of the vehicle as seen from a vehicle width direction.

4. The passenger protection device according to claim 1, wherein when the upper airbag and the lower airbag are in an inflated state, a gap is present between the upper airbag and the lower airbag such that the upper airbag and the lower airbag do not contact each other.

5. The passenger protection device according to claim 1, wherein when the lower airbag is in an inflated state, the lower airbag is completely below the windshield of the vehicle.

6. The passenger protection device according to claim 1, wherein the upper airbag, when viewed from the vehicle lateral side in the inflated and deployed state, includes an inflatable duct that is inflated into an L-shape, and a non-inflatable fabric section that extends between opposite sides of the L-shape.

7. The passenger protection device according to claim 1, wherein the upper airbag is formed by an inflatable duct that forms outer edges of the upper airbag, and the inflatable duct inflates into an L-shape, and the upper airbag includes a non-inflatable rear fabric section that extends vertically and extends between the outer edges formed by the inflatable duct, a non-inflatable bottom fabric section that extends horizontally and extends between the outer edges formed by the inflatable duct, a non-inflatable right fabric section that is triangular and extends between opposite sides of the L-shape, and a non-inflatable left fabric section that is triangular and extends between opposite sides of the L-shape.

8. The passenger protection device according to claim 7, wherein:

the upper airbag defines an open space that is exposed to the windshield in the inflated and deployed state, and the open space is bounded by the inflatable duct, the non-inflatable rear fabric section, the non-inflatable bottom fabric section, the non-inflatable right fabric section, and the non-inflatable left fabric section.

* * * * *